(12) United States Patent
Shilman et al.

(10) Patent No.: US 7,574,048 B2
(45) Date of Patent: Aug. 11, 2009

(54) FREEFORM DIGITAL INK ANNOTATION RECOGNITION

(75) Inventors: Michael Shilman, Seattle, WA (US); Zile Wei, Berkeley, CA (US); David M. Bargeron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 483 days.

(21) Appl. No.: 10/934,306

(22) Filed: Sep. 3, 2004

(65) Prior Publication Data
US 2006/0050969 A1    Mar. 9, 2006

(51) Int. Cl.
G06K 9/00 (2006.01)

(52) U.S. Cl. .................. 382/187; 382/188; 382/224; 715/231; 715/232; 715/233; 715/512; 715/751; 345/179; 345/156; 345/173

(58) Field of Classification Search .............. 382/187
See application file for complete search history.

(56) References Cited

U.S. PATENT DOCUMENTS

| | | | |
|---|---|---|---|
| 3,701,095 A | 10/1972 | Yamaguchi et al. | |
| 4,955,066 A | 9/1990 | Notenboom | |
| 5,109,433 A | 4/1992 | Notenboom | |
| 5,181,255 A | 1/1993 | Bloomberg | |
| 5,237,628 A | 8/1993 | Levitan | |
| 5,297,216 A | 3/1994 | Sklarew | |
| 5,465,353 A | 11/1995 | Hull et al. | |
| 5,499,294 A | 3/1996 | Friedman | |
| 5,526,444 A | 6/1996 | Kopec et al. | |
| 5,542,006 A | 7/1996 | Shustorovich et al. | |
| 5,594,809 A | 1/1997 | Kopec et al. | |
| 5,699,244 A * | 12/1997 | Clark et al. ............. | 702/2 |
| 5,812,698 A | 9/1998 | Platt et al. | |
| 5,832,474 A | 11/1998 | Lopresti et al. | |
| 5,867,597 A | 2/1999 | Peairs et al. | |
| 5,999,653 A | 12/1999 | Rucklidge et al. | |
| 6,137,908 A | 10/2000 | Rhee | |
| 6,233,353 B1 | 5/2001 | Danisewicz | |
| 6,279,014 B1 * | 8/2001 | Schilit et al. ............ | 715/512 |
| 6,356,922 B1 * | 3/2002 | Schilit et al. ............ | 715/512 |
| 6,393,395 B1 | 5/2002 | Guha et al. | |
| 6,397,212 B1 | 5/2002 | Biffar | |
| 6,470,094 B1 | 10/2002 | Lienhart et al. | |

(Continued)

OTHER PUBLICATIONS

Bargeron et al, "Reflowing Digital Ink Annotations", Apr. 5-10, 2003, ACM, vol. 5, Issue No. 1, pp. 385-392.*

(Continued)

Primary Examiner—Brian Q Le
Assistant Examiner—Edward Park
(74) Attorney, Agent, or Firm—Lyon & Harr, LLP; Richard T. Lyon

(57) ABSTRACT

The present invention leverages classification type detectors and/or context information to provide a systematic means to recognize and anchor annotation strokes, providing reflowable digital annotations. This allows annotations in digital documents to be archived, shared, searched, and easily manipulated. In one instance of the present invention, an annotation recognition method obtains an input of strokes that are grouped, classified, and anchored to underlying text and/or points in a document. Additional instances of the present invention utilize linguistic content, domain specific information, anchor context, and document context to facilitate in correctly recognizing an annotation.

41 Claims, 17 Drawing Sheets

U.S. PATENT DOCUMENTS

| | | | |
|---|---|---|---|
| 6,487,301 B1 | 11/2002 | Zhao | |
| 6,523,134 B2 | 2/2003 | Korenshtein | |
| 6,546,385 B1 | 4/2003 | Mao et al. | |
| 6,580,806 B1 | 6/2003 | Sato | |
| 6,587,217 B1 | 7/2003 | Lahey et al. | |
| 6,594,393 B1 | 7/2003 | Minka et al. | |
| 6,658,623 B1 | 12/2003 | Schilit et al. | |
| 6,687,876 B1* | 2/2004 | Schilit et al. | 715/512 |
| 6,869,023 B2 | 3/2005 | Hawes | |
| 6,928,548 B1 | 8/2005 | Hale et al. | |
| 6,938,203 B1 | 8/2005 | Dimarco et al. | |
| 7,010,751 B2* | 3/2006 | Shneiderman | 715/232 |
| 7,024,054 B2 | 4/2006 | Cahill et al. | |
| 7,062,497 B2 | 6/2006 | Hamburg et al. | |
| 7,111,230 B2* | 9/2006 | Euchner et al. | 715/512 |
| 7,120,299 B2* | 10/2006 | Keskar et al. | 382/187 |
| 7,327,883 B2 | 2/2008 | Polonowski | |
| 7,373,291 B2 | 5/2008 | Garst | |
| 2002/0032698 A1 | 3/2002 | Cox | |
| 2002/0078088 A1* | 6/2002 | Kuruoglu et al. | 707/512 |
| 2002/0116379 A1 | 8/2002 | Lee et al. | |
| 2003/0076537 A1 | 4/2003 | Brown | |
| 2003/0123733 A1 | 7/2003 | Keskar et al. | |
| 2003/0152293 A1 | 8/2003 | Bresler et al. | |
| 2004/0003261 A1 | 1/2004 | Hayashi | |
| 2004/0015697 A1 | 1/2004 | de Queiroz | |
| 2004/0078757 A1 | 4/2004 | Golovchinsky et al. | |
| 2004/0090439 A1 | 5/2004 | Dillner | |
| 2004/0107348 A1 | 6/2004 | Iwamura | |
| 2004/0189667 A1 | 9/2004 | Beda et al. | |
| 2004/0205542 A1 | 10/2004 | Bargeron et al. | |
| 2004/0205545 A1 | 10/2004 | Bargeron et al. | |
| 2004/0252888 A1 | 12/2004 | Bargeron et al. | |
| 2005/0138541 A1* | 6/2005 | Euchner et al. | 715/512 |
| 2005/0165747 A1 | 7/2005 | Bargeron et al. | |
| 2006/0045337 A1 | 3/2006 | Shilman et al. | |
| 2006/0050969 A1 | 3/2006 | Shilman et al. | |

OTHER PUBLICATIONS

Ellis et al, "A Collaborative Annotation System for Data Visualization", May 25-28, 2004, ACM, pp. 411-414.*
Michael Shilman, et al., Recognizing Freeform Digital Ink Annotations, IAPR International Workshop on Document Analysis Systems, Sep. 8-10, 2004, Florence, Italy.
I. Phillips, et al., "CD-ROM Document Database Standard" Proc. Second Int'l Conf. on Document Analysis and Recognition, 1993, pp. 478-483.
S. Marinai, et al., "Recognizing Freeform Digital Ink Annotations" Proceedings of the 6th International Workshop on Document Analysis Systems, 2004, vol. 2163, pp. 322-331.
G. Golovchinsky, et al., "Moving Markup: Repositioning Freeform Annotation" UIST 02. Proceedings of the 15th Annual ACM Symposium on user Interface Software and Technology, 2002, vol. conf. 15, pp. 21-29.
European Search Report dated Dec. 29, 2006, mailed for European Patent Application Serial No. 05 108 068.7, 2 Pages.
Sriram Ramachandran and Ramanujan Kashi, "An Architecture for ink Annotations on Web Documents", Proceedings of the Seventh International Conference on Document Analysis and Recognition, Aug. 3-6, 2003 pp. 256-260 vol. 1 Retrieved from IEEE Xplore on Sep. 27, 2006.
Ivan Poupyrev, Numada Tomokazu and Suzanne Weghorst, "Virtual Notepad: Handwriting in Immersive VR", IEEE, Proceedings of VRAIS' Atlanta, Georgia, Mar. 1998 Retrieved from CiteSeer on Sep. 28, 2006.
Marcel Gotze, Stefan Schlechtweg and Thomas Strothotte, "The Intelligent Pen—Toward a Uniform Treatment of Electronic Documents", 2002 Retrieved from CiteSeer on Sep. 28, 2006.
D. Niyogi, et al., Knowledge-based derivation of document logical structure, 1995, pp. 472-475, In Third International Conference on Document Analysis and Recognition, Montreal, Canada.
A. Conway, Page Grammars and Page Parsing: A Syntactic Approach to Document Layout Recognition, 1993, In Proceedings of the 2nd International Conference on Document Analysis and Recognition, Tsukuba Science City, Japan, pp. 761-764.
E.G. Miller, et al., Ambiguity and constraint in mathematical expression recognition, 1998, 8 pages, In Proceedings of the National Conference of Artificial Intelligence. American Association of Artificial Intelligence.
T. Tokuyasu, et al., Turbo recognition: a statistical approach to layout analysis, 2001, in Proceedings of the SPIE, San Jose, CA, vol. 4307, pp. 123-129.
T. Kanungo, et al., Stochastic language model for style-directed physical layout analysis of documents, 2003, p. 583-596, In IEEE Transactions on Image Proceedings, vol. 5, No. 5.
D. Blostein, et al., Applying compiler techniques to diagram recognition, In Proceedings of the 16th International Conference on Pattern Recognition, 2002, vol. 3, pp. 123-136.
J. F. Hull, Recognition of mathematics using a two dimensional trainable context-free grammar, Master's thesis, MIT, Jun. 1996, 101 pages.
N. Matsakis, Recognition of handwritten mathematical expressions, May 1999, pp. 1-59, Master's thesis, Massachusetts Institute of Technology, Cambridge, MA.
J. Lafferty, et al., Conditional Random Fields: Probabilistic Models for Segmenting and Labeling Sequence Data, 2001, In Proceedings of the 18th International Conference on Machine Learning, Morgan Kaufmann, San Francisco, CA, pp. 282-289.
E. Charniak, et al., Edge-Based Best-First Chart Parsing, 1998, In Proceedings of the 14th National Conference on Artificial Intelligence, pp. 127-133.
D. Klein, et al., A* parsing: Fast Exact Viterbi Parse Selection, Stanford University, 2001, 8 pages, Tech. Rep. dbpubs/2002-16.
Y. Freund, et al., A Decision-Theoretic Generalization of On-line Learning and an Application to Boosting, 1995, In Computational Learning Theory: Eurocolt '95, Springer-Verlag, pp. 23-37.
P. Viola, et al., Rapid Object Detection Using a Boosted Cascade of Simple Features, 2001, p. 1-9, In Proceedings of the IEEE Conference on Computer Vision and Pattern.
T. Breuel, High Performance Document Layout Analysis, 10 pages, In 2003 Symposium on Document Image Understanding Technology, Greenbelt Maryland.
R. Zanibbi, et al., A Survey of Table Recognition: Models, Observations, Transformations, and Inferences, International Journal of Document Analysis and Recognition, 2004, vol. 7, No. 1. pp. 1-16.
K. F. Chan, et al., Mathematical Expression Recognition: A Survey, 2000, International Journal on Document Analysis and Recognition, vol. 3, pp. 3-15.
E. Charniak, Statistical Techniques for Natural Language Parsing, AI Magazine, 1997, vol. 18, No. 4, pp. 33-44.
M. Kay, Chart Generation, In Proceedings of the 34th Annual Meeting of the Association for Computational Linguistics (ACL '96), Santa Cruz, California, 1996, pp. 200-204.
M. Viswanathan, et al., Document Recognition: An Attribute Grammar Approach, Mar. 1996, In Proc. SPIE vol. 2660, Document Recognition III, Vincent/Hull, Eds., pp. 101-111.
C.D. Manning, et al., Foundations of Statistical Natural Language Processing. The MIT Press, 1999, pp. 1-3.
Tobias Schefer, et al., Active Hidden Markov Models For Information Extraction, In Advances in Intelligent Data Analysis, 4th International Conference, IDA 2001, pp. 309-318.
P. Chou, Recognition Of Equations Using a 2-D Stochastic Context-Free Grammar, In SPIE Conference on Visual Communications and Image Processing, Philadelphia, PA, 1989, pp. 852-863.
M. Kay, Algorithm Schemata And Data Structures In Syntactic Processing, 1986, pp. 35-70.
Michael Shilman, et al., Spatial Recognition and Grouping of Text and Graphics, Eurographics Workshop on Sketch-Based Interfaces and Modeling, 2004, 5 pages, Hughes/Jorge, Eds.

Michael Shilman, et al., Recognition and Grouping of Handwritten Text in Diagrams and Equations, IWFHR 2004, Sep. 2004, pp. 69-77, Toyko, Japan.

S. Mao, et al., Document structure analysis algorithms: A literature survey, Jan. 2003, vol. 5010, pp. 197-207, In Proc. SPIE Electronic Imaging.

Vladimir N. Vapnik, Statistical Learning Theory, 1998, pt. 1, 62 pages (front cover-40).

Vladimir N. Vapnik, Statistical Learning Theory, 1998, pt. 2, 62 pages (41-100).

Vladimir N. Vapnik, Statistical Learning Theory, 1998, pt. 3, 62 pages (101-162).

Vladimir N. Vapnik, Statistical Learning Theory, 1998, pt. 4, 62 pages (163-226).

Vladimir N. Vapnik, Statistical Learning Theory, 1998, pt. 5, 60 pages (227-287).

Vladimir N. Vapnik, Statistical Learning Theory, 1998, pt. 6, 60 pages (288-348).

Vladimir N. Vapnik, Statistical Learning Theory, 1998, pt. 7, 62 pages (349-413).

Vladimir N. Vapnik, Statistical Learning Theory, 1998, pt. 8, 50 pages (414-464).

Vladimir N. Vapnik, Statistical Learning Theory, 1998, pt. 9, 41 pages (465-505).

Vladimir N. Vapnik, Statistical Learning Theory, 1998, pt. 10, 35 pages (506-540).

Vladimir N. Vapnik, Statistical Learning Theory, 1998, pt. 11, 35 pages (541-576).

Vladimir N. Vapnik, Statistical Learning Theory, 1998, pt. 12, 65 pages (577-642).

Vladimir N. Vapnik, Statistical Learning Theory, 1998, pt. 13, 45 pages (643-686).

Vladimir N. Vapnik, Statistical Learning Theory, 1998, pt. 14, 50 pages (687-back cover).

Murphey, et al. "Neural Learning Using AdaBoost" (2001) IEEE, 6 pages.

U.S. Appl. No. 11/095,393, filed Oct. 5, 2006, David Bargeron, et al.

U.S. Appl. No. 11/165,070, filed Dec. 28, 2006, David Bargeron.

U.S. Appl. No. 11/171,064, filed Jan. 25, 2007, David Bargeron.

European Search Report dated Feb. 1, 2006 for European Patent Application No. EP05000750. 7 pages.

J.J. Hull. "Document Image Matching and Retrieval with Multiple Distortion-Invariant Descriptors". Document Analysis Systems, World Scientific Publishing Co. 1995. pp. 379-396, Retrieved from the internet: http://rii.richoh.com/{hull/pubs/hull_das94.pdf>. Retrieved on Dec. 6, 2005.

J.J. Hull, et al. "Document Image Matching Techniques". Symposium on Document Image Understanding Technology, Apr. 30, 1997, pp. 31-35.

Wang Shin-Ywan, et al. "Block selection: a method for segmenting a page image of various editing styles." Document Analysis and Recognition, 1995. Proceedings of the Third International Conference on Montreal, Quebec, Canada. Aug. 14-16, 1995. pp. 128-133. Los Alamitos, CA, USA, IEEE Computer Soc., US, vol. 1.

V. Eglin, et al. "Document page similarity based on layout visual saliency: application to query by example and document classification". Document Analysis and Recognition, 2003. Proceedings of the 7th International Conference. Aug. 3-6, 2003. Piscataway, NJ. IEEE, Aug. 3, 2003, pp. 1208-1212.

C.L. Tan, et al. "Text extraction using pyramid." Pattern Recognition, Jan. 1998, pp. 63-72, vol. 1, No. 1, Elsevier, Kidlington, GB.

H. Peng, et al. "Document image template matching based on component block list". Pattern Recognition Letters, Jul. 2001, pp. 1033-1042, vol. 22, No. 9, North-Holland Publ. Amsterdam, NL.

D. Doermann. "The Index and Retrieval of Document Images: A Survey". Computer Vision and Image Understanding, Jun. 1998, pp. 287-298, vol. 70, No. 3, Academic Press, San Diego, CA, US.

D. Doermann, et al. "The detection of duplicates in document image databases." Proceedings of the 4th International Conference on Document Analysis and Recognition. ULM, Germany, Aug. 18-20, 1997, pp. 314-318, Proceedings of the ICDAR, Los Alamitos, IEEE Comp. Soc. US, vol. II.

S. Mitaim, et al. "Neutral fuzzy agents that learn a user's preference map". Digital Libraries, 199. ADL '97. Proceedings, IEEE International Forum on Research and Technology Advances in Washington, D.C. , US May 7-9, 1997, Los Alamitos, IEEE Comp. Soc. US, May 7, 1997, pp. 25-35.

B. Erol, et al. "Institute of Electrical and Electronics Engineers: Linking presentation documents using image analysis". Conference Record of the 37th Asilomar Conference on Signals, Systems, & Computers. Pacific Grove, CA, US, Nov. 9-12, 2003. p. 97-101. Asilomar Conference on Signals, Systems and Computers, New York, NY, IEEE, vol. 1 of 2.

Benolin Jose, et al. "Vector Based Image Matching for Indexing in Case Based Reasoning Systems". 4th German Workshop on Case-based Reasoning-System Development and Evaluation, 1996, pp. 1#7.

R. Hauck. Partial European Search Report. Apr. 15, 2005. 2 pages. Munich, Germany.

Tung-Shou Chen, et al., "A New Search Engine for Chinese Document Image Retrieval Based on Chinese Character Segmentation Features". International Journal of Computer Processing of Oriental Languages, 2002, pp. 417-431. vol. 14, No. 4.

Jonathan J. Hull, et al., "Document Image Similarity and Equivalence Detection". ICDAR'97, 1997, pp. 308-312, vol. 1, Ulm, Germany.

John F. Cullen, et al., "Document Image Database Retrieval and Browsing using Texture Analysis". ICDAR'97, 1997, pp. 718-721, Ulm, Germany.

Nevin Heintze, "Scalable Document Fingerprinting (Extended Abstract)". Proceedings of the Second USENIX Workshop on Electronic Commerce, 1996, pp. 1-10.

Narayanan Shivakumar, et al., "The SCAM Approach to Copy Detection in Digital Libraries". D-Lib Magazine, 1995, 9 pages.

Sergey Brin, et al., "Copy Detection Mechanisms for Digital Documents". Proceedings of the ACM SIGMOD Annual Conference, 1995, pp. 1-21.

Michael Collins, et al., "Logistic Regression, AdaBoost, and Bregman Distances", Machine Learning, 48(1/2/3) 2002, pp. 1-26.

Thomas M. Cormen, et al., "Introduction to Algorithms", Cambridge, MA: The MIT Press, 1990, p. 448.

Hans P. Graf, et al., "Analysis of Complex and Noisy Check Images", Proceedings of IEEE International Conference on Image Processing (KIP-95). IEEE Computer Society Press, 1995, pp. 316-319.

Patrice Y. Simard, et al., "An Efficient Binary Image Activity Detector Based on Connected Components", International Conference on Accoustic, Speech and Signal Processing (ICASSP), Montreal, May 2004, p. 229-232.

Yoav Freund, et al., "Experiments with a New Boosting Algorithm". Machine Learning: Proceedings of the Thirteenth International Conference, 1996. pp. 148-156.

Ihsin Phillips, et al., "CD-ROM Document Database Standard" Proc. Second Int'l Conf. on Document Analysis and Recognition, 1993, pp. 478-483.

Yefeng Zheng, et al., "Machine Printed Text and Handwriting Identification in Noisy Document Images" In IEEE Transactions on Pattern Analysis and Machine Intelligence, Mar. 2003, pp. 337-353, vol. 26, No. 3.

David Bargeron, et al. "Boosting-Based Transductive Learning for Text Detection". Proceedings of the 8th International Conference on Document Analysis and Recognition (ICDAR'05), pp. 1166-1171.

Michael Shilman, et al., "Recognizing Freeform Digital Ink Annotations", IAPR International Workshop on Document Analysis Systems, Sep. 8-10, 2004, 12 pages, Florence, Italy.

Ming Ye, et al., "Document Image Matching and Annotation Lifting". Proceedings of the 6th International Conference on Document Analysis and Recognition (ICDAR 2001), Seattle, Washington, Sep. 10-13, 2001, pp. 753-760.

"About Virtual Desktop Managers". Accessible at http://www.virtual-desktop.info. Last accessed on May 17, 2006, 3 pages.

Vinajak R. Borkar, et al., Automatically extracting structure from free text addresses, 2000, 6 pages, In Bulletin of the IEEE Computer Society Technical committee on Data Engineering. IEEE.

Remco Bouckaert, Low level information extraction: A bayesian network based approach, 2002, 9 pages, In Proceedings of TextML, 2002, Sydney, Australia.

Claire Cardie, et al., Proposal for an interactive environment for information extraction, 1998, 12 pages, Technical Report TR98-1702, 2.

Rich Caruana, et al., High precision information extraction, Aug. 2000, 7 pages, In KDD-2000 Workshop on Text Mining.

M. Collins, Discriminative training methods for hidden markov models : Theory and experiments with perception algorithms, Jul. 2002, p. 1-8, In Proceedings of Empirical Methods in Natural Language Processing (EMNLP02).

Corinna Cortes, et al., Support-vector networks. Machine Learning, 1995, 20(3): 273-297.

Y. Freund, et al., Large margin classification using the perception algorithm, Machine earning, 37(3):277-296, 1999.

T. Kristjansson, et al., Interactive information extraction with constrained conditional random fields, 2004, In Proceedings of the 19th international conference on artificial intelligence, AAAI. pp. 412-418.

John Lafferty, et al., Conditional random fields: Probabilistic models for segmenting and labeling sequence data, 2001, In Proc. 18th International Conf. on Machine Learning, pp. 282-289. Morgan Kaufmann, San Francisco, CA.

M. Marcus, et al., The penn treebank: Annotating predicate argument structure, 1994, pp. 114-119.

Andrew McCallum, Efficiently inducing features of conditional random fields, 2003, 8 pages, In Nineteenth Conference on Uncertainty in Artificial Intelligence (UAI03).

Andrew McCallum, et al., Early results for named entity recognition with conditional random fields, feature induction and web-enhanced lexicons, 2003, 4 pages, In Hearst/Ostendorf, Eds, HLT-NAACL, Ass'n for Computational Linguistics, Edmonton, Alberta, Canada.

Kamal Nigam, et al., Using maximum entropy for text classification, 1999, 7 pages, In Proceedings of the IJCAI'99 Workshop on Information Filtering.

David Pinto, et al., Table extraction using conditional random fields, 2003, 8 pages, In Proceedings of the ACM SIGIR'03, Jul. 28-Aug. 1, 2003, Toronto, Canada.

L.R. Rabiner, A tutorial on hidden markov models and selected applications in speech recognition, 1989, In Proceedings of the IEEE, vol. 77, pp. 257-286.

Fei Sha, et al., Shallow parsing with conditional random fields. In Hearst/Ostendorf, Eds, 2003, HLT-NAACL: Main Proceedings, pp. 213-220, Ass'n for Computational Linguistics, Edmonton, Alberta, Canada.

J. Stylos, et al., Citrine:providing intelligent copy-and-paste, 2005, In Proceedings of ACM Symposium on User Interface Software and Technology (UIST 2004), pp. 185-188.

B. Taskar, et al., Max-margin parsing, 2004, 8 pages, In Empirical Methods in Natural Language Processing (EMNLP04).

M. Krishnamoorthy, et al., Syntactic segmentation and labeling of digitized pages from technical journals, 1993, IEEE Transactions on Pattern Analysis and Machine Intelligence, vol. 15, pp. 737-747.

J. Kim, et al., Automated labeling in document images, Jan. 2001, p. 1-12, In Document Recognition and Retrieval VIII, vol. 4307. Available online at http://archive.nlm.nih.gov/pubs/kim/spie2001/spie2001.pdf, last checked Apr. 2, 2006.

OA Dated Jul. 25, 2008 for U.S. Appl. No. 11/171,064, 15 pages.

OA Dated Oct. 21, 2008 for U.S. Appl. No. 10/927,452, 22 pages.

OA Dated Oct. 3, 2008 for U.S. Appl. No. 11/165,070, 11 pages.

Ellis et al, "A Collaborative Annotation System for Data Visualization," Proceedings of the working conference on Advanced Visual Interfaces, May 25-28, 2004, ACM 1-58113-867-9/04/0500, pp. 411-414. http://delivery.acm.org/10.1145/990000/989938/p411-ellis.pdf?key1=989938&key2=1838085221&coll=GUIDE&dl=GUIDE&CFID=9420863&CFTOKEN=15500950. Last accessed Nov. 4, 2008, 4 pages.

Bargeron et al, "Reflowing Digital Ink Annotations," Paper: Techniques for On-screen Shapes, Text and Handwriting. CHI 2003, Apr. 5-10, 2003, Ft. Lauderdale, Florida, USA., vol. 5, Issue No. 1, pp. 385-392. http://www.dgp.toronto.edu/~tomer/store/papers/reflowchi03.pdf. Last accessed Nov. 4, 2008, 8 pages.

OA Dated Mar. 5, 2009 for U.S. Appl. No. 10/927,452, 21 pages.

OA Dated Nov. 18, 2008 for U.S. Appl. No. 11/095,393, 53 pages.

Lienhart, et al. Empirical Analysis of Detection Cascades of Boosted Classifiers for Rapid Object Detection. In DAGM, 2003.

Taira, et al. Text categorization Using Transductive Boosting. Proceedings of ECML-01, 12th European Conference on Machine Learning. Freiburg, DE, Springer Verlag, Heidelberg, DE: 445-465, 2001.

* cited by examiner (A) USER ANNOTATIONS (B) REFLOWED ANNOTATIONS (C) CLEANED ANNOTATIONS

FIG. 6

FREEFORM DIGITAL INK ANNOTATION RECOGNITION

RELATED APPLICATIONS

This application is related to co-pending and co-assigned U.S. applications entitled "SPATIAL RECOGNITION AND GROUPING OF TEXT AND GRAPHICS," filed on Aug. 26, 2004 and assigned Ser. No. 10/927,452; "ELECTRONIC INK PROCESSING," filed on Aug. 21, 2003 and assigned Ser. No. 10/644,900; and "HANDWRITING LAYOUT ANALYSIS OF FREEFORM DIGITAL INK INPUT," filed on May 14, 2002 and assigned Ser. No. 10/143,865. The above-noted applications are incorporated herein by reference.

TECHNICAL FIELD

The present invention relates generally to recognition, and more particularly to systems and methods for recognizing freeform digital ink annotations to text and/or graphics.

BACKGROUND OF THE INVENTION

Every day people become more dependent on computers to help with both work and leisure activities. However, computers operate in a digital domain that requires discrete states to be identified in order for information to be processed. This is contrary to humans who function in a distinctly analog manner where occurrences are never completely black or white, but always seem to be in between shades of gray. Thus, a central distinction between digital and analog is that digital requires discrete states that are disjunct over time (e.g., distinct levels) while analog is continuous over time. As humans naturally operate in an analog fashion, computing technology has evolved to alleviate difficulties associated with interfacing humans to computers (e.g., digital computing interfaces) caused by the aforementioned temporal distinctions.

A key set is one of the earliest human-machine interface devices, traditionally utilized in a typewriter. Unfortunately, not everyone who wants to utilize a computer knows how to type. This limits the number of computer users who could adequately utilize computing technology. One solution was to introduce a graphical user interface that allowed a user to select pictures from a computing monitor to make the computer do a task. Thus, control of the computing system was typically achieved with a pointing and selecting device known as a "mouse." This permitted a greater number of people to utilize computing technology without having to learn to use a keyboard. Although these types of devices made employing computing technology easier, it is still not as intuitive as handwriting and drawing.

Technology first focused on attempting to input existing typewritten or typeset information into computers. Scanners or optical imagers were used, at first, to "digitize" pictures (e.g., input images into a computing system). Once images could be digitized into a computing system, it followed that printed or typeset material should be able to be digitized also. However, an image of a scanned page cannot be manipulated as text or symbols after it is brought into a computing system because it is not "recognized" by the system, i.e., the system does not understand the page. The characters and words are "pictures" and not actually editable text or symbols. To overcome this limitation for text, optical character recognition (OCR) technology was developed to utilize scanning technology to digitize text as an editable page. This technology worked reasonably well if a particular text font was utilized that allowed the OCR software to translate a scanned image into editable text.

Subsequently, OCR technology reached an accuracy level where it seemed practical to attempt to utilize it to recognize handwriting. The problem with this approach is that existing OCR technology was tuned to recognize limited or finite choices of possible types of fonts in a linear sequence (i.e., a line of text). Thus, it could "recognize" a character by comparing it to a database of pre-existing fonts. If a font was incoherent, the OCR technology would return strange or "non-existing" characters, indicating that it did not recognize the text. Handwriting proved to be an even more extreme case of this problem. When a person writes, their own particular style shows through in their penmanship. Signatures are used, due to this uniqueness, in legal documents because they distinguish a person from everyone else. Thus, by its very nature, handwriting has infinite forms even for the same character. Obviously, storing every conceivable form of handwriting for a particular character would prove impossible. Other means needed to be achieved to make handwriting recognition a reality.

As is typical, users continued to demand more from their systems. Thus, just recognizing a page eventually was not enough to satisfy all users. Although the digital age has made some aspects of working with documents easier, many users prefer to use traditional means of input into computer systems. For these reasons, devices such as portable digital writing surface devices were created. These systems allow users to write as they would traditionally but the writing is automatically digitized via a specialized writing surface. This enables users that have not adapted to traditional keyboard typing for data entry and the like to use systems via this type of technology. Users eventually began using the devices to edit documents and drawings. These markings or "annotations" became part of the digital document in a "fixed" or picture form. Thus, as long as the document remained the same and was not manipulated, the annotated marks remained over the underlying text. However, as can be expected, opening a digital document in different word processors or different screen resolutions causes the document to change in layout and size. This causes the annotations to become disconnected and improperly applied to other areas of the document. This leads to great confusion to the meaning of the marks and severely limits the applicability of digital annotations. A user must feel confident that their editing comments, drawing insertions, and other annotations remain in place so that any user can retrieve the document and interpret the comments the same as the author had intended.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to recognition, and more particularly to systems and methods for recognizing freeform digital ink annotations to text and/or graphics. Classification type detectors and/or context information are leveraged to provide a systematic means to recognize and anchor annotation strokes, providing reflowable digital annotations. This allows annotations in digital documents to be archived, shared, searched, and easily manipulated. In one instance of the present invention, an annotation recognition method obtains an input of strokes that are grouped, classified, and anchored to underlying text and/or points in a document. Additional instances of the present invention utilize linguistic content, domain specific information, anchor context, and document context to facilitate in correctly recognizing an annotation. Thus, the present invention provides a real-time, accurate, and efficient method for recognizing and manipulating digital document annotations.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 6 is an illustration of annotation reflow and cleaning in accordance with an aspect of the present invention.

DETAILED DESCRIPTION OF THE INVENTION

Figure 1:
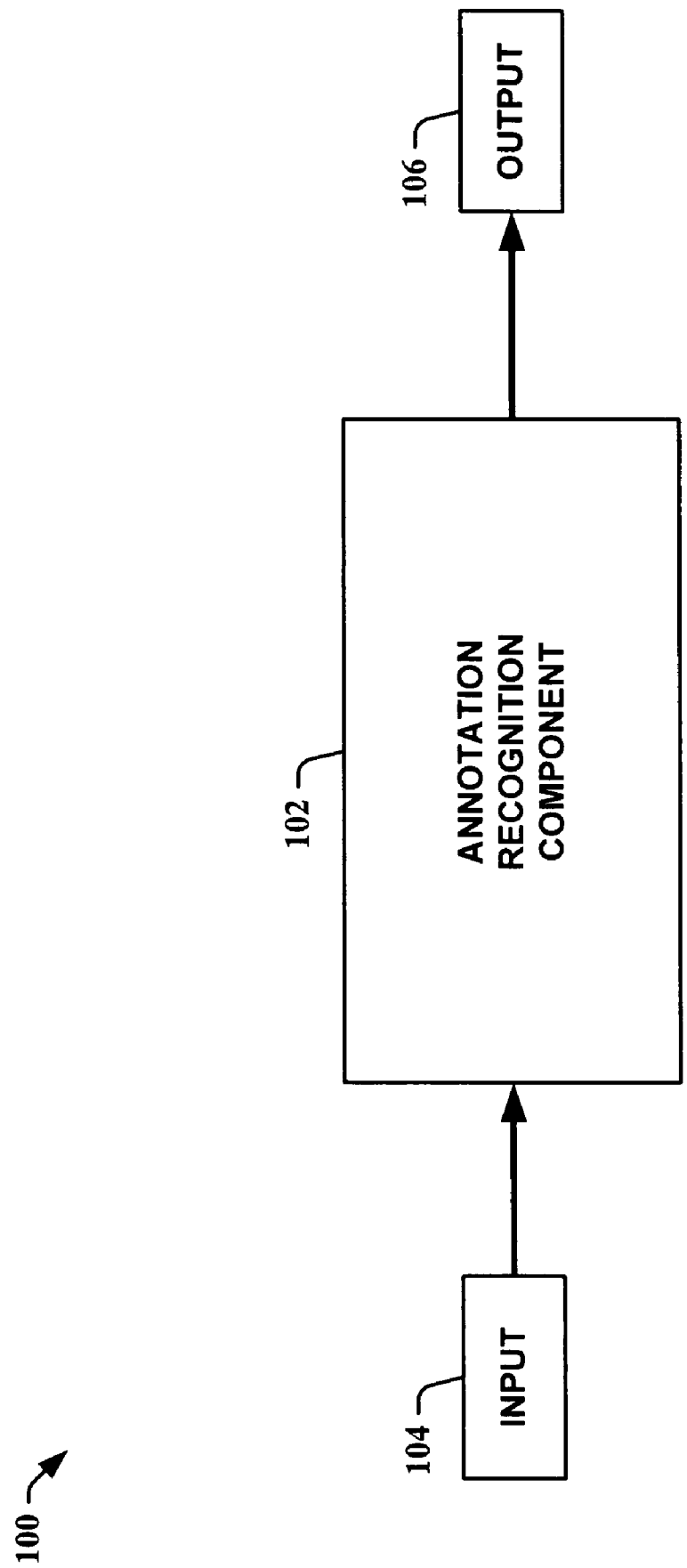
FIG. 1 is a block diagram of an annotation recognition system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Digital ink annotations are utilized to mimic physical annotation of paper documents and improve the user experience for document processing. The present invention provides systems and methods for recognizing freeform digital ink annotations created utilizing a paper-like annotation interface such as a digital writing surface (e.g., a Tablet PC). The term "recognized annotation" utilized herein refers to an annotation that is fully manipulatable and is 'understood.' This may or may not mean the annotation is anchored to a point in a document. However, it is understood that the recognized annotation is meant to be directed towards a particular item. In one instance of the present invention, annotation recognition includes grouping digital ink strokes into annotations, classifying annotations into one of a number of types, and anchoring those annotations to an appropriate portion of the underlying document. For example, a line drawn under several words of text might be classified as an underline and anchored to the words it is underlining.

Annotations on digital documents have clear advantages over annotations on paper. They can be archived, shared, searched, and easily manipulated. Freeform digital ink annotations add the flexibility and natural expressiveness of pen and paper, but sacrifice some of the structure inherent to annotations created with mouse and keyboard. For instance, current ink annotation systems do not anchor the ink so that it can be logically reflowed as the document is resized or edited. If digital ink annotations do not reflow to keep up with the portions of the document they are annotating, the ink can become meaningless or even misleading. The present invention provides an approach to recognizing digital ink annotations to infer this structure, restoring the strengths of more structured digital annotations to a preferable freeform medium. The present invention is easily extensible to support new annotation types and efficiently resolves ambiguities between different annotation elements in real-time. Digital ink strokes can also be recognized non-real-time as a background process.

In FIG. 1, a block diagram of an annotation recognition system 100 in accordance with an aspect of the present invention is shown. The annotation recognition system 100 is comprised of an annotation recognition component 102 that receives an input 104 and provides an output 106. The input 104 is comprised of digital ink strokes that, for example, represent a page of a document. The document is often composed entirely of text but can also have graphics as well. The input 104 can be a directly digitized input such as that from a digital writing surface and/or from a hard copy document that has been digitized (i.e., scanned). The annotation recognition component 102 analyzes the input 104 and determines the layout of the page and separates out annotation related information from page information. Strokes are grouped and processed to determine an appropriate annotation. The processing can occur real-time and/or non-real-time. This allows recognition to occur as priority processing and/or as background processing. Other instances of the present invention can employ context information, such as document context and/or anchor context information, and textual content information (i.e., linguistic information) to facilitate in determining an appropriate annotation. Still other instances of the present invention can further interpret meanings of annotations and execute and/or command actions related to the annotations. The present invention can also determine appropriate anchor points in the document for the recognized annotations, providing reflow capability when a document is resized and/or otherwise manipulated.

Other instances of the present invention utilize colors associated with the input 104 to further facilitate in recognizing an annotation. Knowledge of colors that represent annotation related information such as, for example, importance, age of annotation, user identity, and/or annotation type can be employed by the present invention to increase annotation recognition. Likewise colors can be utilized by the present invention during output to facilitate in identifying types of annotations and/or source of inputs and the like. Other stylistic characteristics can be employed by the present invention including, but not limited to thickness of a digital ink stroke, pen tip style employed to create a digital ink stroke, transparency level of a digital ink stroke, and viscosity level of a digital ink stroke. Non-stylistic characteristics can be employed as well. These include, but are not limited to timestamps on digital ink strokes and serial numbers on a pen tip cursor utilized to create digital ink strokes.

Instances of the present invention can also utilize machine learning techniques to facilitate in classifying annotation types. Applicable techniques, for example, are found in co-pending and co-assigned application entitled "SPATIAL RECOGNITION AND GROUPING OF TEXT AND GRAPHICS," filed on Aug. 26, 2004 and assigned Ser. No. 10/927,452. This application describes machine learning techniques that automatically tune classifiers to facilitate in recognizing digital ink strokes. The present invention can employ these techniques as well. Still other instances of the present invention can utilize multiple annotations to facilitate in annotation recognition. By considering other annotations, the desired type and/or meaning of a candidate annotation can be construed through maximization of joint probabilities.

The output 106 of the annotation recognition component 102 can include, but is not limited to, annotations, annotation anchor points, annotation action commands, and/or direct annotation action edits. The output can be utilized to provide additional annotation related features such as beautification, color encoding, and/or language/symbol conversions and the like. The present invention can also provide context-based annotation extensions such as extending an annotation to apply to multiple domains whether language domains, symbol domains, and/or user-specific domains. For example, user-specific annotations can be converted to professional type set annotations and/or an Arabic-based text can be converted to symbol-based text and the like. Instances of the present invention can also include searchable annotation groupings that can, for example, facilitate a user in identifying such items as number of deletions, additions, and changes and the like. Collaborative filtering techniques can also be employed to facilitate in searching annotations. These techniques, for example, can be utilized to determine what pages and/or sections of a very large document drew substantial scrutiny from a large group of reviewers and the like.

Figure 2:
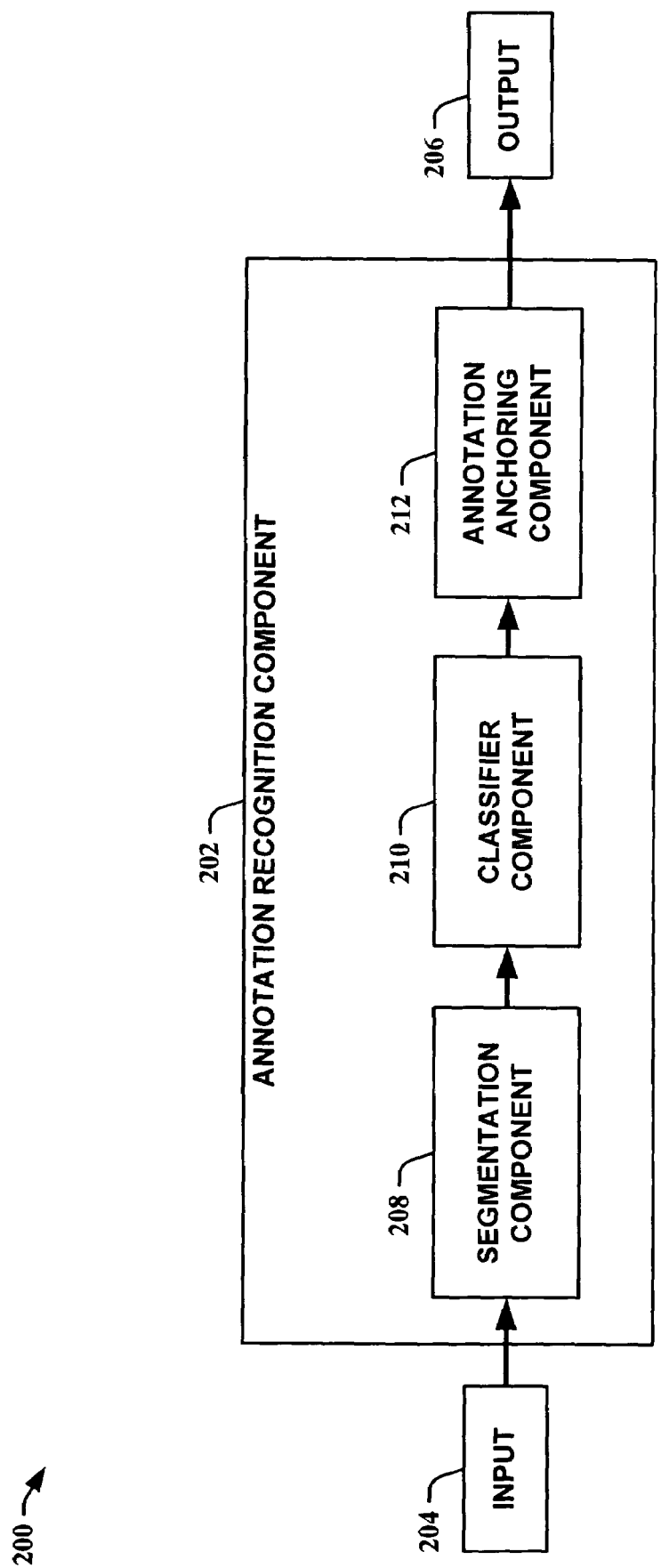
FIG. 2 is another block diagram of an annotation recognition system in accordance with an aspect of the present invention.

Referring to FIG. 2, another block diagram of an annotation recognition system 200 in accordance with an aspect of the present invention is depicted. The annotation recognition system 200 is comprised of an annotation recognition component 202 that receives an input 204 and provides an output 206. The annotation recognition component 202 is comprised of a segmentation component 208, a classifier component 210, and an annotation anchoring component 212. The segmentation component 208 receives the input 204, such as a digital ink stroke input, and segments the strokes to form groupings of possible annotation candidates. The classifier component 210 receives the annotation candidates from the segmentation component 208 and detects/identifies (i.e., "recognizes") annotations from the received annotation candidates. The annotation anchoring component 212 receives the recognized annotations and determines anchor points for the annotations. These anchor points allow for reflow of the annotations as an underlying document changes. The annotations and anchor points are then made available as the output 206. Other instances of the present invention can perform direct interaction with an underlying document to effect updates and changes as required for proper annotation display and/or annotation actions.

Figure 3:
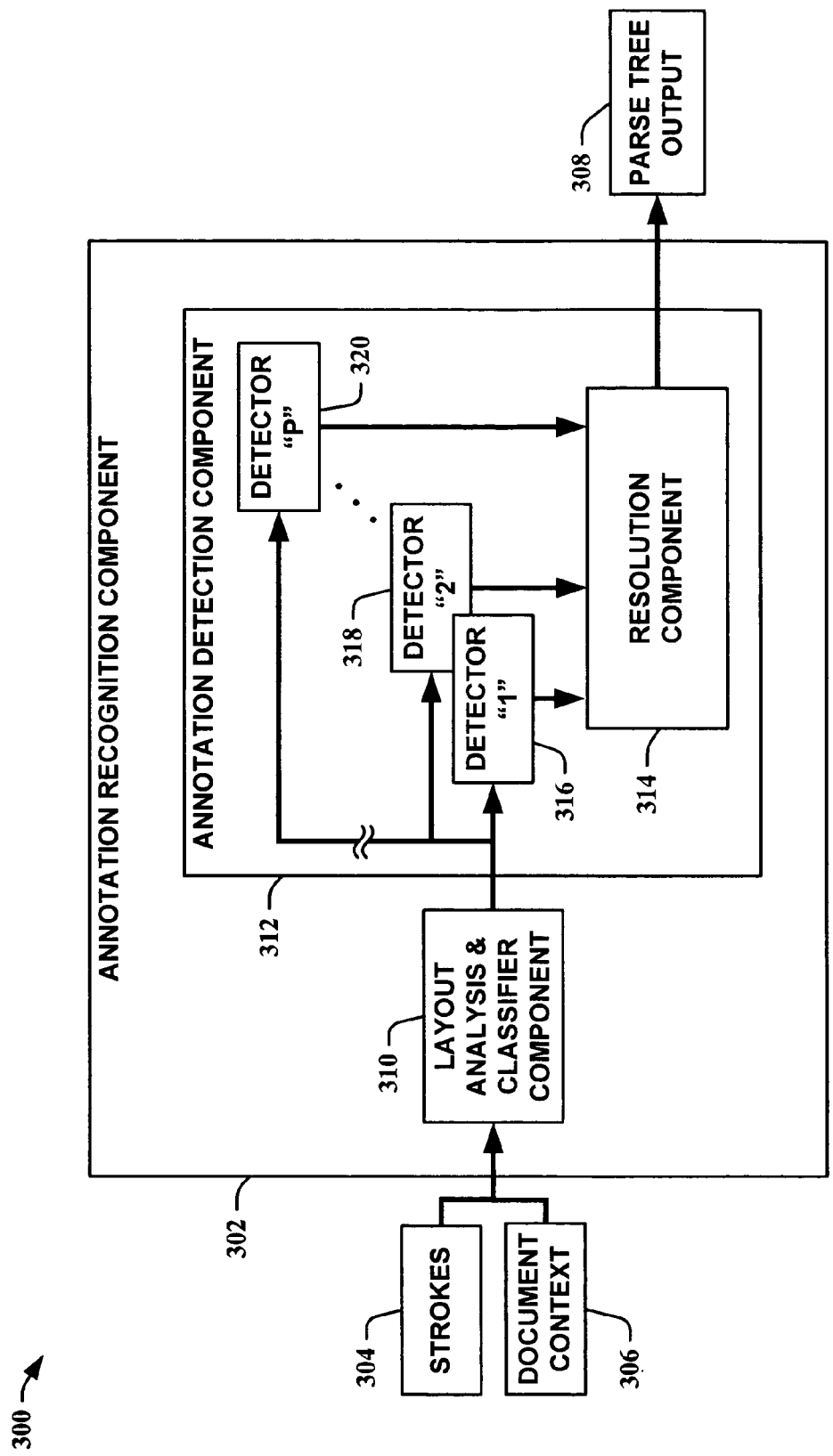
FIG. 3 is yet another block diagram of an annotation recognition system in accordance with an aspect of the present invention.

Turning to FIG. 3, yet another block diagram of an annotation recognition system 300 in accordance with an aspect of the present invention is illustrated. The annotation recognition system 300 is comprised of an annotation recognition component 302 that receives strokes 304 and document context 306 inputs and provides a parse tree output 308. The annotation recognition component 302 is comprised of a layout analysis & classification component 310 and an annotation detection component 312. The annotation detection component 312 is comprised of a resolution component 314 and detectors 1-P 316-320, where P represents a finite positive integer. The layout analysis & classification component 310 receives the stroke and document context inputs 304, 306 and processes the information. It 310, in one instance of the present invention, groups/separates writing strokes and drawing strokes and groups writing strokes into words, lines, and paragraphs. The layout analysis & classification component 310 produces an initial structural interpretation of the strokes without considering the under lying document context.

The annotation detection component 312 then seeks common annotation markup relative to the abstraction of the document context input 306, producing a revised structural interpretation of the strokes and linking structures to elements in the document context abstraction. The annotation detection component 312 employs individual type detectors 1-P 316-320 that identify and anchor a particular annotation type from the stroke input 304 on a document page. The individual type detectors 1-P 316-320 utilize techniques specific to its annotation type in order to determine possible annotation groups. The resolution component 314 receives the output from the type detectors 1-P 316-320 and extracts the most likely annotations, selecting the best candidates when conflicts exist. One skilled in the art will appreciate that the annotation detection component 312 can be easily expanded by adding additional type detectors as required. The resolution component 314 produces the parse tree output 308 with anchors into the document context.

Figure 4:
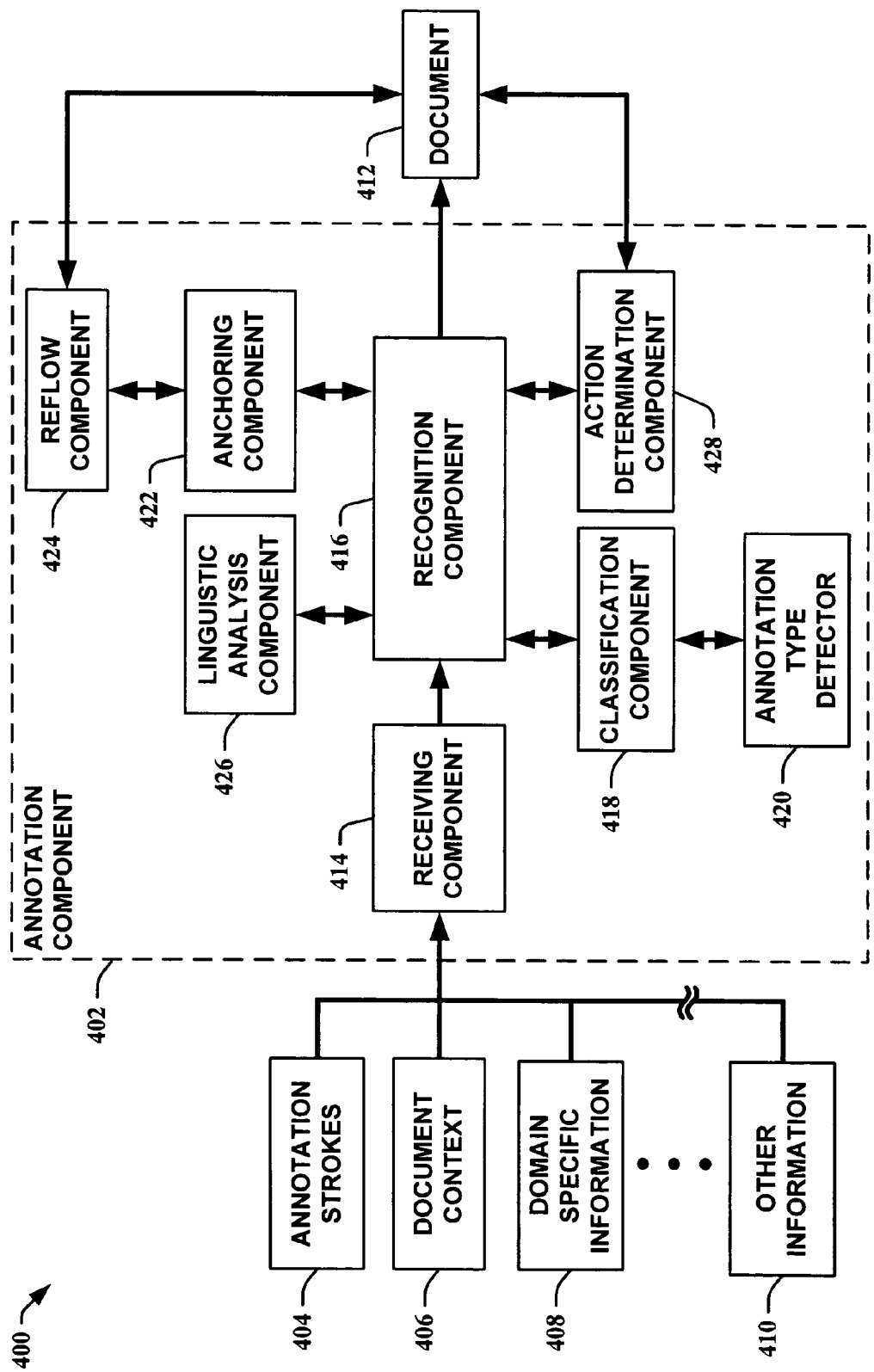
FIG. 4 is still yet another block diagram of an annotation recognition system in accordance with an aspect of the present invention.

Looking at FIG. 4, still yet another block diagram of an annotation recognition system 400 in accordance with an aspect of the present invention is shown. The annotation recognition system 400 is comprised of an annotation component 402 that receives various inputs 404-410 and produces outputs that effect/pertain to a document 412. This instance of the present invention illustrates additional functionality that can be utilized within the scope of the present invention. One skilled in the art will appreciate that not all components are necessary to practice the present invention. Likewise, not all of the various inputs are necessary as well. The various inputs 404-410 are comprised of an annotation stroke input 404, a document context input 406, domain specific information input 408, and other information input 410. The other information input 410 represents additional information that can be utilized by the present invention but is not explicitly named. In this instance of the present invention, the annotation recognition component 402 is comprised of a receiving component 414, a recognition component 416, a classification component 418, an annotation type detector 420, an anchoring component 422, a reflow component 424, a linguistic component 426, and an action determination component 428.

The receiving component 414 receives the various inputs 404-410 and relays them to the recognition component 416. The recognition component 416 processes the inputs 404-410 and produces annotation related information directed to the document 412. The recognition component 416 can utilize other additional components to facilitate in processing the various inputs 404-410. The recognition component 416 can interface with the classification component 418 to facilitate in classifying annotations. The classification component 418 can interface with the annotation type detector 420 to facilitate in detecting annotation types. The recognition component 416 can also interface with a linguistic analysis component 426 to facilitate in determining annotations as well. The linguistic analysis component 426 can utilize text located within the document 412 to determine a context for the annotation and to gain insight as to a meaning of a particular annotation. Linguistic features can also be integrated into a classifier utilized by the recognition component 416. To accommodate different languages, classification features can be modified depending on the context and/or the language in which an annotation is written.

The recognition component 416 can also interact with the anchoring component 422 to provide anchor points for the recognized annotations. The anchoring component 422 can then interface with the reflow component 424 to provide reflow capabilities for the document 412. The reflow component 424 facilitates displaying of the recognized annotations correctly in a document window. It 424 can also provide annotation indicators when the document 412 is summarized. The annotation indicators can be, for example, flags that indicate where a recognized annotation is located within a document. This enables a user to know that an annotation, although not explicitly shown, is associated with a section of a document that the user is interested in.

The recognition component 416 can also interface with the action determination component 428 to facilitate in interpreting the meaning of a recognized annotation. The action determination component 428 can identify an annotation action and further interface with the document 412 to execute the determined action. The linguistic analysis component 426 can also be utilized to facilitate the action determination component 428 in identifying actions represented by an annotation. The recognition component 416 can also utilize the domain specific information input 408 to add additional context to facilitate in recognizing annotations as well as determining correct annotation actions and the like. The domain specific information 408 includes, but is not limited to, user specific information, document topic information, professional or setting information, and/or domain information that provides a boundary to limit the possible number of selections that the recognition component 416 processes.

The value of the supra systems are better appreciated by understanding the importance of recognizable annotations. While the vision of the paperless office remains a future goal, many technologies including high-resolution displays, advances in digital typography, and the rapid proliferation of networked information systems are contributing to a better electronic reading experience for users. One important area of enabling research is digital document annotation. Digital annotations persist across document versions and can be easily searched, shared, and analyzed in ways that paper annotations cannot.

Figure 5:
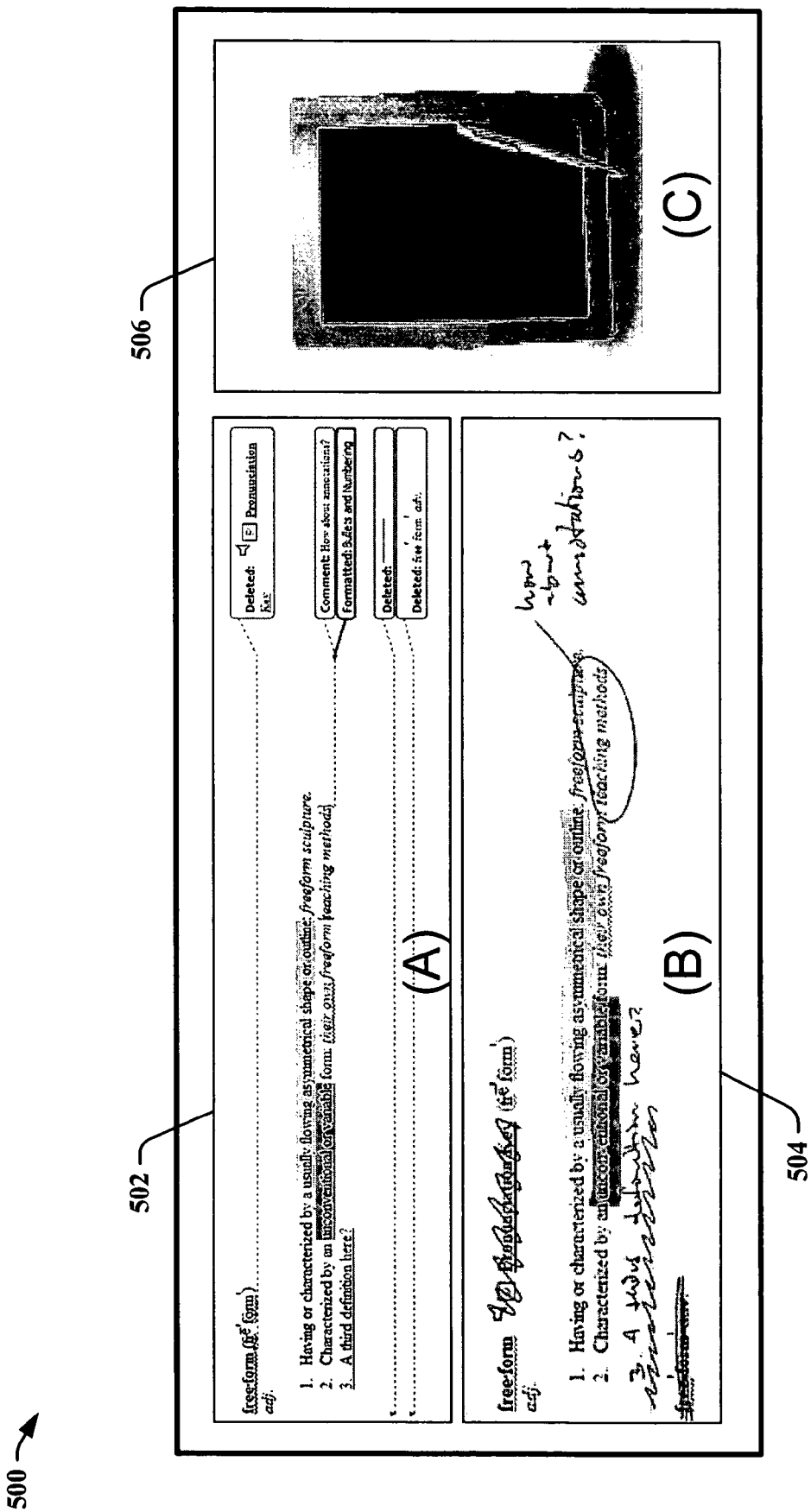
FIG. 5 is an illustration of examples of digital ink stroke inputs and a digital surface writing device in accordance with an aspect of the present invention.

FIG. 5 is an illustration 500 of (A) a digital text annotated and edited with "formal" annotations 502, and (B) equivalently with informal, freeform annotations 504, and (C) a tablet-like computer with pen to annotate documents with digital ink 506. Many digital annotation systems employ a user interface in which the user selects a portion of the document and a post-it-like annotation object is anchored at that point, as shown in FIG. 5(A) 502. The user enters text into the post-it by typing on the keyboard. Later, as the document is edited, the post-it reflows with the anchor. While this method is widely utilized among commercial applications, it is a cumbersome user interface. Consequently, many users choose to print out their documents and mark them up with a pen on paper, losing the benefits of digital annotations in the process.

A user interface in which users sketch their annotations in freeform digital ink (FIG. 5(B) 504) on a tablet-like reading appliance (FIG. 5(C) 506) overcomes some of these limitations. By mimicking the form and feel of paper on a computer, this method streamlines the user interface and allows the user to focus on the reading task. For instance, in describing their xLibris system, Schilit et al. introduce the term active reading, a form of reading in which critical thinking, learning, and synthesis of the material results in document annotation and note-taking. By allowing users to mark directly on the page they add "convenience, immersion in the document context, and visual search" (see, W. Schilit, G. Golovchinsky, and M. Price; Beyond Paper: Supporting Active Reading with Free Form Digital Ink Annotations; Proc. of ACM CHI 1998; ACM Press. pp. 249-256).

The present invention provides a technique for recognizing freeform digital ink annotations created utilizing a paper-like annotation interface such as on a Tablet PC. In one instance of the present invention, annotation recognition includes grouping digital ink strokes into annotations, classifying annotations into one of a number of types, and anchoring those annotations to an appropriate portion of the underlying document. For example, a line drawn under several words of text might be classified as an underline and anchored to the words it is underlining. The full set of annotation types and anchoring relationships that are supported are described infra. There are several reasons why it is desirable to recognize digital ink annotations, including annotation reflow, automatic beautification, and attributing the ink with actionable editing behaviors.

Figure 6:
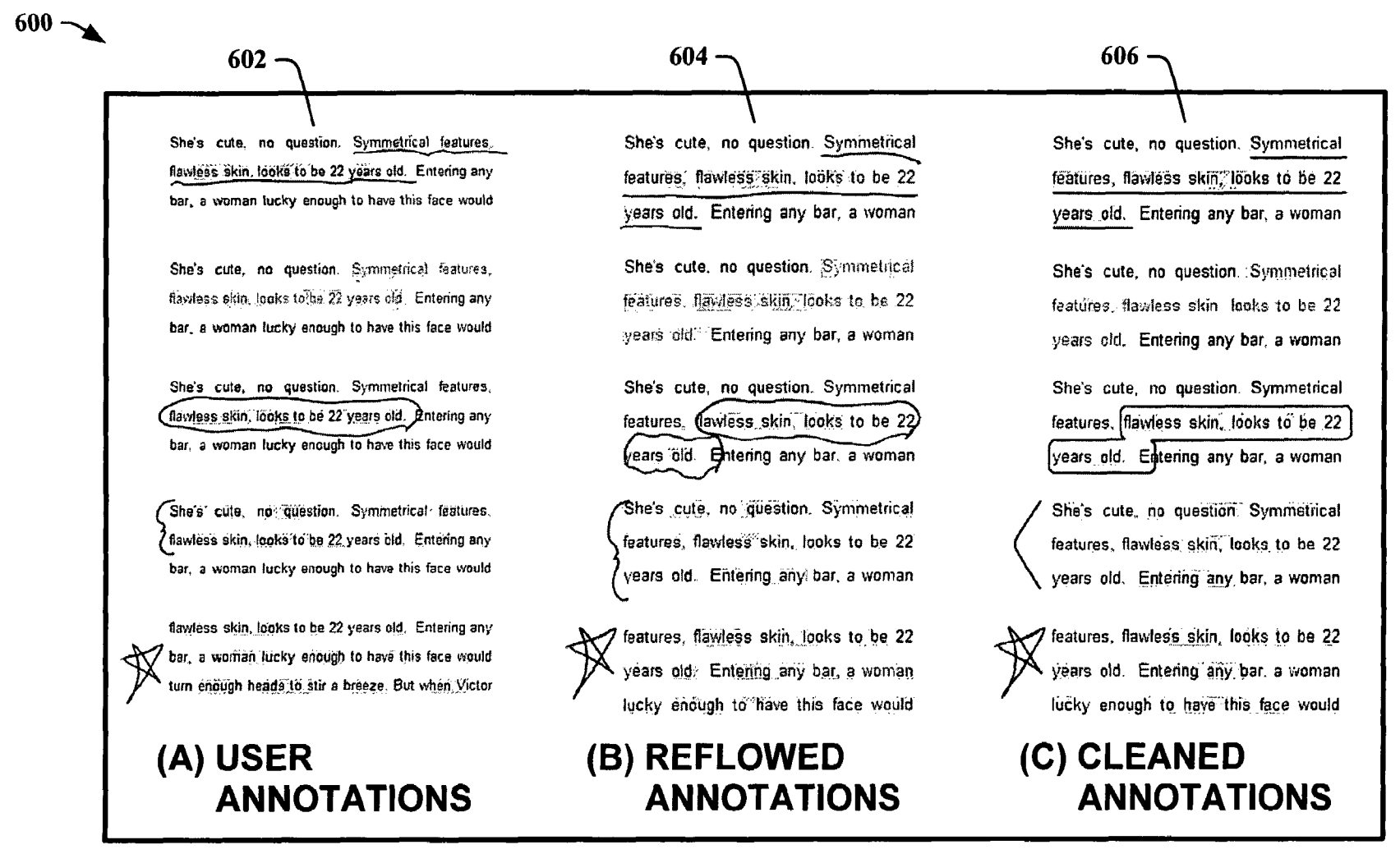

FIG. 6 is an illustration 600 of reflowing and cleaning annotations—(A) original user annotations 602 (B) are properly reflowed as the document is edited 604 and then (C) cleaned by the system based on its automatic interpretation 606. One goal is to reflow digital ink, as shown in FIG. 6(A) 602 and (B) 604. Unlike their physical counterparts, digital documents are editable and viewable on different devices. Consequently, the document layout may change. If digital ink annotations do not reflow to keep up with the portions of the document they are annotating, the ink can become meaningless or even misleading. Recognizing, anchoring, and reflowing digital ink annotations can avoid this detrimental outcome. Golovchinsky and Denoue first observed this problem (see, G. Golovchinsky, L. Denoue; Moving Markup: Repositioning Freeform Annotations; Proc. of ACM UIST 2002; ACM Press, pp. 21-30), but the simple heuristics they report are not robust to a large number of real-world annotations, and they do not propose a framework in which to incorporate new types of annotations.

A second goal of recognition is to automatically beautify the annotations, as shown in FIG. 6(C) 606. While freeform inking is a convenient input medium, Bargeron reports that document authors prefer a stylized annotation when reading through comments made by others (see, D. Bargeron and T. Moscovich; Reflowing Digital Ink Annotations; Proc. of CHI 2003; ACM Press, pp. 385-393.).

A third goal for recognizing digital ink annotations is to make the annotations actionable. Many annotations convey desired changes to the document, such as "delete these words" or "insert this text here." The Chicago Manual of Style (see, University of Chicago Press; The Chicago Manual of Style; The University of Chicago Press; Chicago, Ill., USA; 13th edition, 1982) defines a standard set of editing symbols. By automatically recognizing annotations, the present invention can add these behaviors to the ink to further streamline the editing process.

Fulfilling these goals in a system is a broad task that incorporates many facets other than recognition. There are user interface issues such as when and how to show the recognition results and how to correct those results. There are software architecture issues such as how to properly integrate such functionality into a real text editor. There are other algorithmic issues such as how to reflow the ink strokes. However, it is useful to separate the annotation recognition process into a well-encapsulated software component. This component is described in detail, including its architecture, algorithm, and implementation. The present invention utilizes a recognition approach in which multiple detectors offer competing hypotheses, which are resolved efficiently via a dynamic programming optimization.

In order to support the application features described supra, including reflow, beautification, and actioning, one instance of the present invention employs a software component to segment, classify, and anchor annotations within a document context. For this instance, the problem is scaled back to handle a fixed vocabulary of annotation types, namely: horizontal range, vertical range, container, connector, symbol, writing, and drawing. Each of these annotation types is defined along with the document context that is required to perform recognition and justify this restricted approach.

Figure 7:
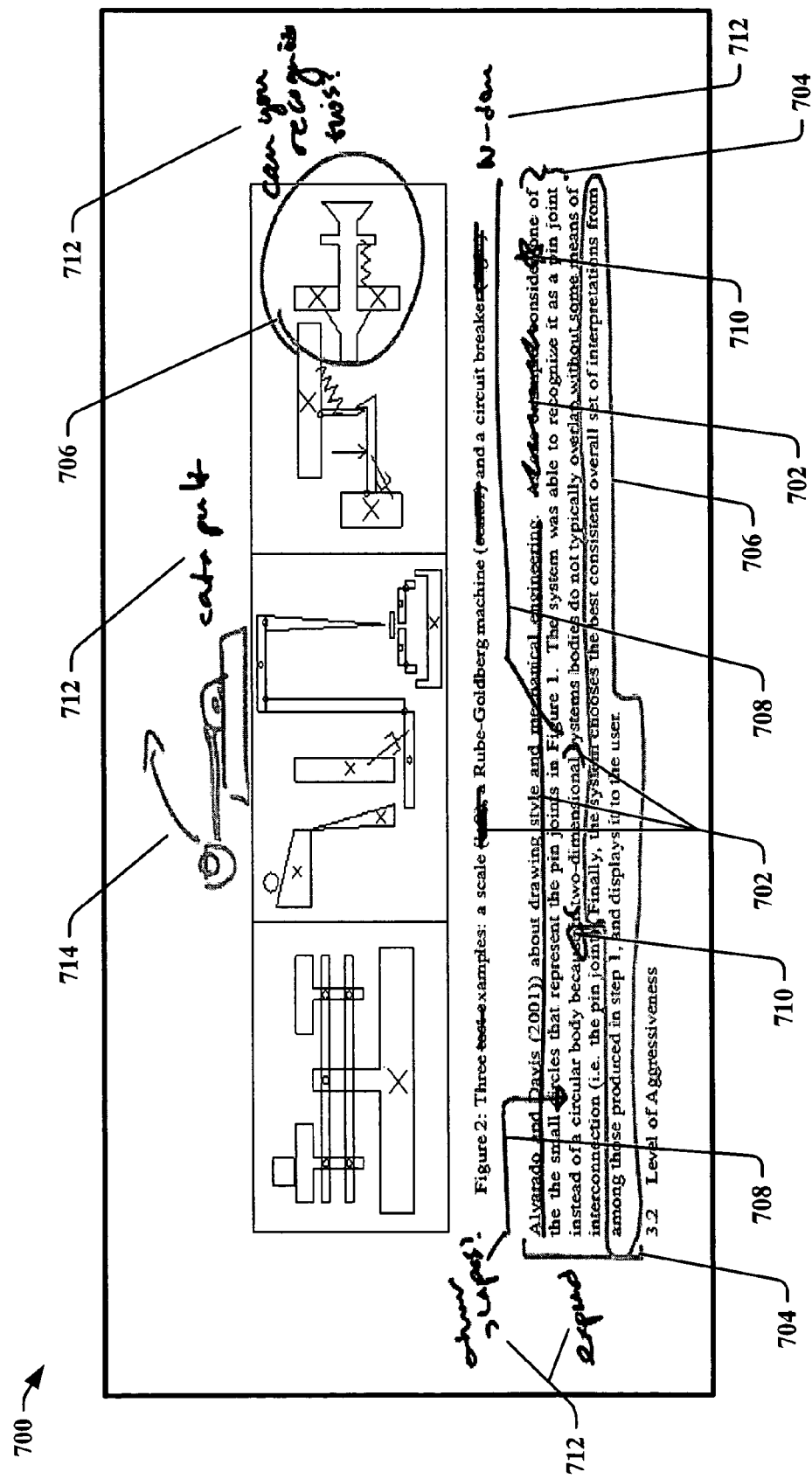
FIG. 7 is another illustration of common annotation types in accordance with an aspect of the present invention.

While the set of all possible annotations is no doubt unbounded, certain common annotations such as underlines and highlights immediately come to mind. To define a basic set of annotations, the work of Brush and Marshall is referred to (see, C. Marshall and A. Brush; From Personal to Shared Annotations; In Proc. of CHI 2002; ACM Press; pp. 812-813), which indicates that in addition to margin notes, a small set of annotations (underline/highlight/container) are predominantly utilized in practice. It is useful to further divide the category of margin notes into writing and drawings for the purposes of text search and reflow behavior. Thus, the problem of annotation recognition as the classification and anchoring of horizontal range, vertical range, container, callout connector, symbol, writing, and drawing annotations is posed. FIG. 7 is an illustration 700 of common annotation types in an example annotated document, namely—horizontal range 702, vertical range 704, container 706, callout connector 708, symbol 710, and writing 712, and drawing 714 marginalia.

Figure 8:
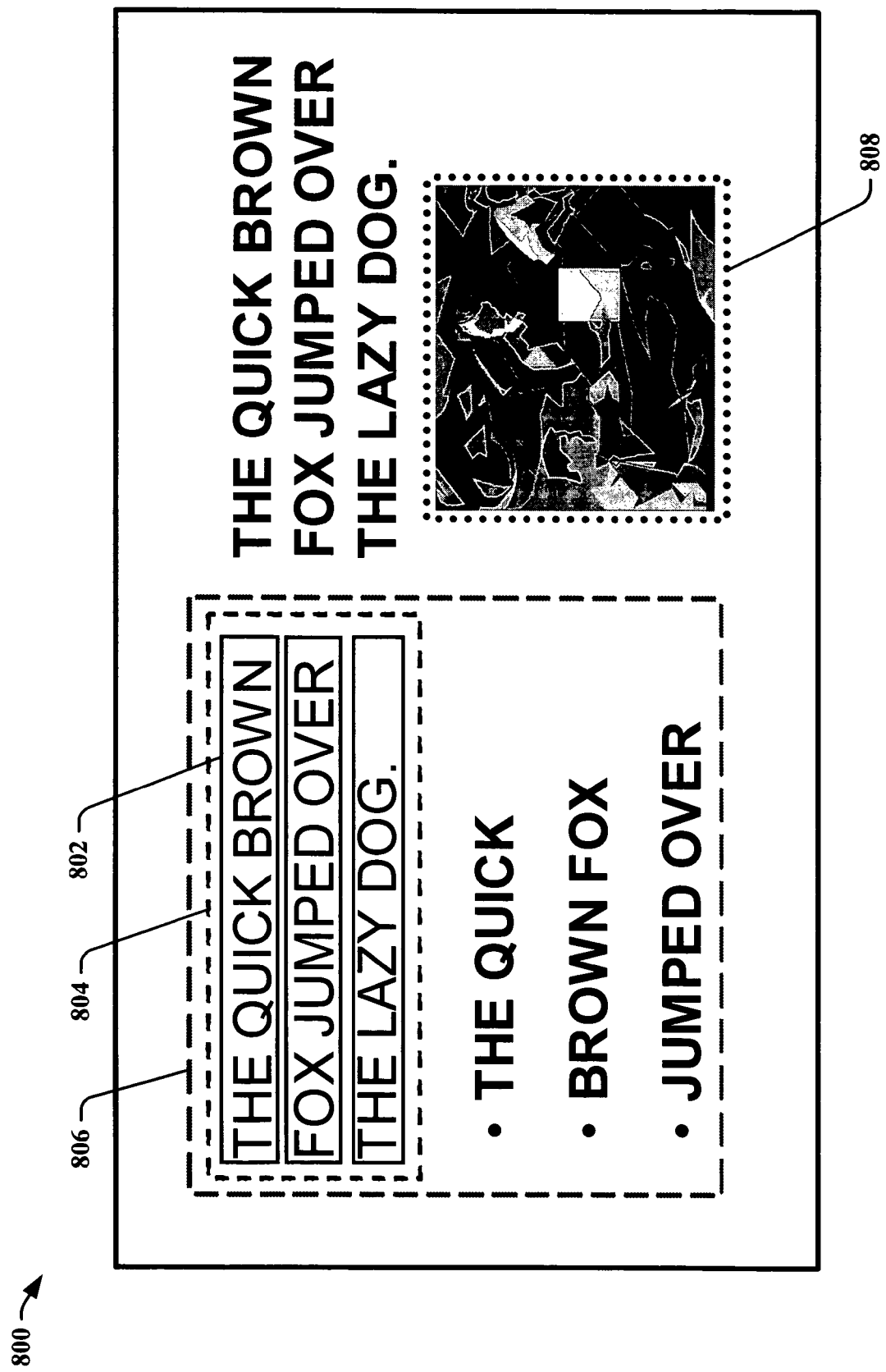
FIG. 8 is an illustration of a simple document context in accordance with an aspect of the present invention.

Annotation is a common activity across a wide variety of documents including text documents, presentation slides, spreadsheets, maps, floor plans, and even video (e.g., weathermen and sports commentators). While it is impossible to build an annotation recognizer that spans every possible document, it is desirable to abstract away the problem so that its solution can be applied to a number of common document types. Defining this appropriate abstraction for document context is difficult: it is unlikely that any simple definition will satisfy all application needs. The present invention utilizes a structure where a document context is defined as a tree structure that starts at the page. The page contains zero or more text blocks and zero or more graphics objects (see, co-pending and co-assigned patent application entitled "ELECTRONIC INK PROCESSING," filed on Aug. 21, 2003 and assigned Ser. No. 10/644,900). Text blocks contain one or more paragraphs, which contain one or more lines, which contain one or more words. FIG. 8 is an illustration 800 of a simple document context. A basic document context contains words and lines of text 802, paragraphs 804, blocks 806, and images/pictures/charts 808. Each of these regions is abstracted by its bounding box (FIG. 8). At this point, for this instance of the present invention, the underlying text of the document is not analyzed: this is typically unnecessary and makes the solution language-independent. However, other instances of the present invention employ linguistics to further facilitate in correctly recognizing and/or actioning an annotation. This definition of context is rich enough to support a wide variety of documents, including but not limited to, word processing documents, slide presentations, spreadsheets, and web pages.

Figure 9:
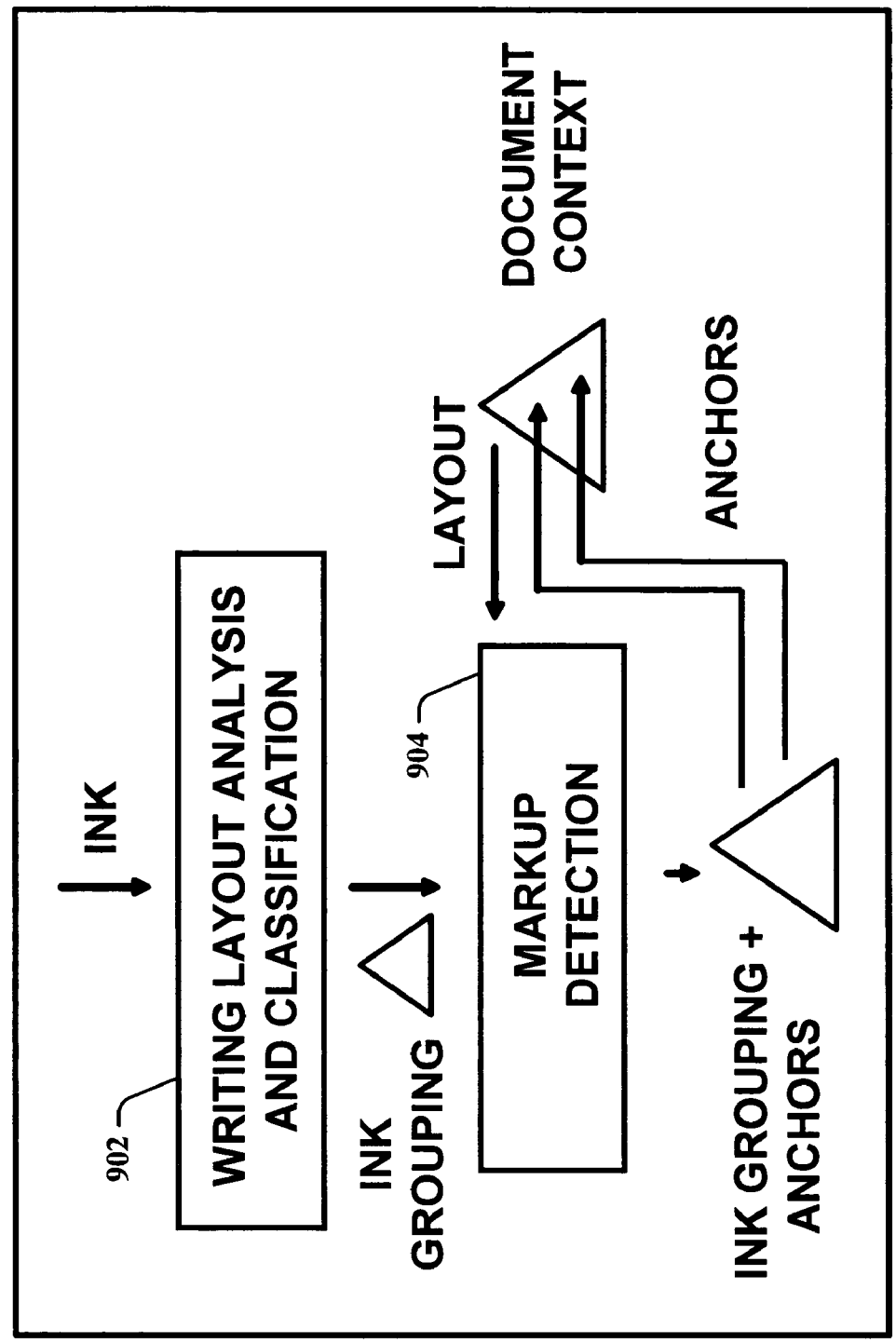
FIG. 9 is an illustration of an example of annotation recognition architecture in accordance with an aspect of the present invention.

Given this implementation, this instance of the present invention employs an encapsulated software component for annotation recognition. FIG. 9 is an illustration 900 of a high-level annotation recognition architecture. A first step 902 separates writing and drawing strokes and groups writing into words, lines, and paragraphs. A second step 904 analyzes ink relative to a document context, classifies markup elements, and anchors the annotations to the document context. The component receives strokes and document context as its input and produces a parse tree with anchors into the document context as its output. With this abstraction, it is easy to incorporate the recognition component into different applications. The annotation recognizer is employable, for example, in such products as web browser plug-ins and the like (see, Bargeron and Moscovich).

The recognition component itself consists of several stages, as shown in FIG. 9. Initially, strokes are run through a component for handwriting layout analysis and classification that groups and separates writing strokes from drawing strokes and groups writing strokes into words, lines, and paragraphs, as described in co-pending and co-assigned patent application entitled "HANDWRITING LAYOUT ANALYSIS OF FREEFORM DIGITAL INK INPUT," filed on May 14, 2002 and assigned Ser. No. 10/143,865. This stage produces an initial structural interpretation of the ink without considering the underlying document context. Once the strokes have been divided into writing and drawing, a markup detection stage looks for common annotation markup (horizontal range, vertical range, container, connector, and symbol) relative to the abstraction of the document context, it produces a revised structural interpretation of the ink, and links the structures to elements in the document context abstraction. The markup detection is described infra.

Markup detection segments and classifies ink into a set of annotation types including horizontal range, vertical range, container, and connector. One possible approach to markup detection is to generate all possible combinations of strokes and classify each with respect to the different classes, maximizing some utility or likelihood over all hypotheses. This approach suffers from several practical problems. First, it is combinatorial-even generic spatial pruning heuristics may not be enough to make the system run in real-time. Second, it relies on enough data to train a reasonable classifier and garbage model.

Since it is desirable to generate an efficient system that can keep pace with user annotation in real-time and not have large quantities of training data available, a more flexible solution is selected. The present invention's markup detection is implemented as a set of detectors. Each detector is responsible for identifying and anchoring a particular annotation type among the ink strokes on the page and utilizes a technique specific to its annotation type in order to prune the search space over possible groups.

Figure 10:
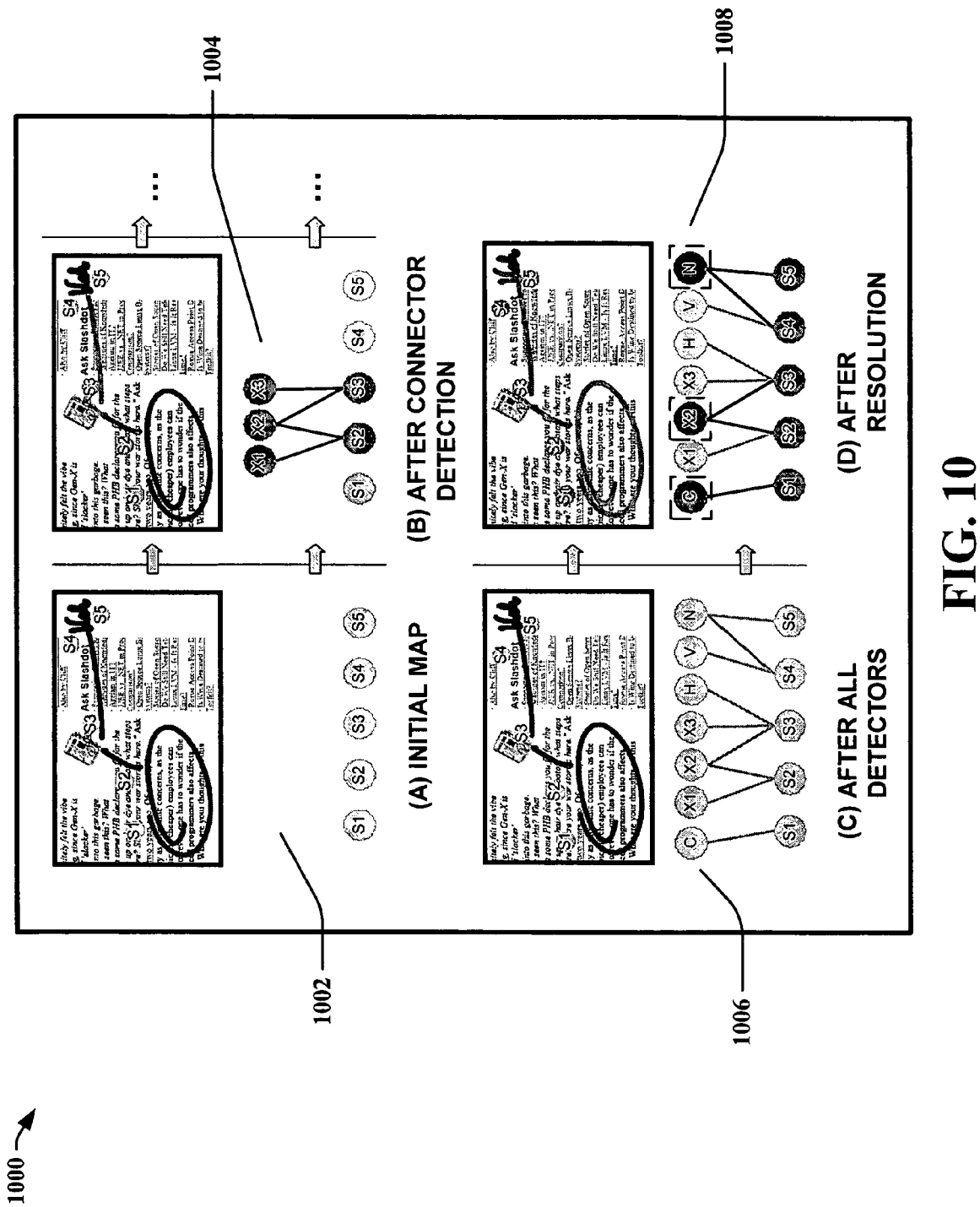
FIG. 10 is an illustration of examples of detector features in accordance with an aspect of the present invention.

When a detector identifies a candidate for a particular annotation type, it adds the resulting hypotheses with an associated confidence to a hypothesis map. FIG. 10 is an illustration 1000 of an example of a hypothesis framework process—(A) initially map is empty 1002, (B) connector detection inputs three conflicting hypotheses (X1, X2, X3) 1004, (C) the rest of the detectors execute, adding container (C), horizontal range (H), vertical range (V), and margin notes (N) to the map 1006, and (D) resolution selects the most likely hypotheses (C, X2, and N) 1008. For example, in FIG. 10(C) 1006, a connector detector hypothesizes that strokes could be connectors on their own (both are relatively straight and have plausible anchors at each of their endpoints, or that they could together form a single connector. A pair of hypotheses conflict if they share any of the same strokes.

Each annotation type has a set of characteristic features that allow it to be distinguished from other annotations and from random strokes on the page. These features can be divided into two categories: stroke features and context features. Stroke features capture the similarity between a set of ink strokes and an idealized version of an annotation. For example, the idealized version of an underline is a straight line, so the stroke features measure the distance between a set of strokes that might be an underline and the best straight line that approximates those strokes, i.e., the total regression error on the points in those strokes. Context features capture the similarity of the best idealized version of a set of strokes and a true annotation on the document context. For example, a stroke might be a perfect straight line, but it is not an underline unless that line falls beneath a set of words in the document.

Figure 11:
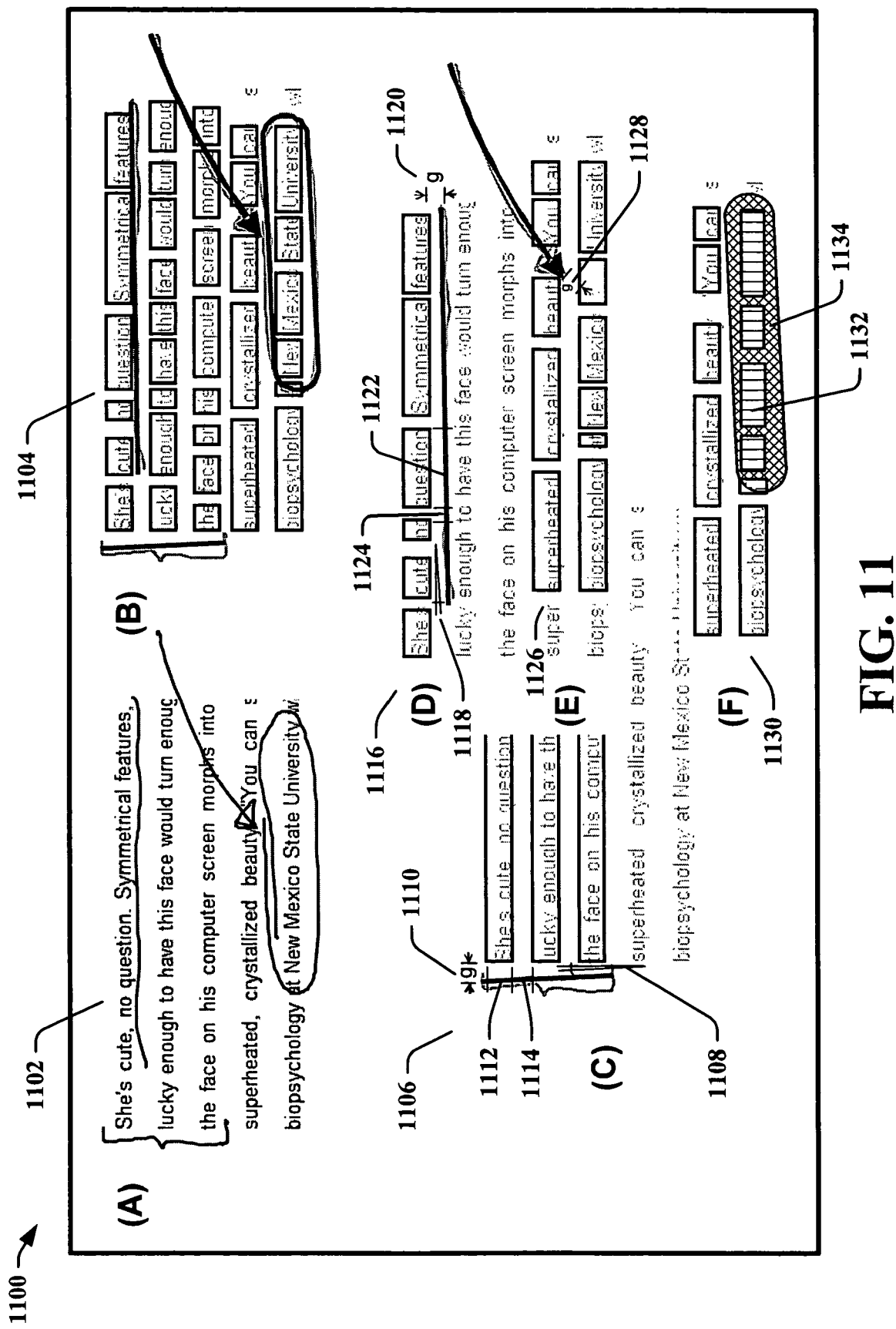
FIG. 11 is an illustration of a hypothesis framework in accordance with an aspect of the present invention.

Thus, the procedure for each detector is to ascertain a best idealized version of the strokes according to its type using stroke features, and then see how well that idealized version fits with the document context using context features. FIG. 11 is an illustration 1100 of detector features—(A) the original ink annotations on the document 1102, (B) the idealized annotations overlayed on the ink annotations, and the document context bounding boxes 1104, (C) vertical range context features 1106 include θ—the angle between the ideal and the lines of text 1108, g—the gap between the ideal and the lines 1110, as well as the sum of the lengths of the overlapping portions of the ideal 1112 and sum of the lengths of the non-overlapping regions 1114, (D) horizontal range context features 1116 include θ—the angle between the ideal and the lines of text 1118, g—the gap between the ideal and the lines 1120, as well as the sum of the lengths of the overlapping portions of the ideal 1122 and sum of the lengths of the non-overlapping regions 1124, (E) callout context features 1126 include g—the distance of the arrowhead to a context word along the tangent of the tip of the arrow 1128, and (F) container context features 1130 include the area overlapping with the context words 1132 and the non-overlapping area with the context words 1134.

Moreover, based on user samples, a set of features for judging the quality of a grouping of strokes relative to a document context can be manually derived. Features are separated into "stroke" features that capture the characteristics of a given set of strokes as a particular type of annotation, and "context" features that capture the characteristics of how a set of strokes should relate to the document context. These features are summarized below in Table 3 and then each feature is defined precisely.

TABLE 3

Summarization of Features

| Class label | Context features | Stroke features |
|---|---|---|
| Horizontal range | Number of contiguous words, percentage of range coverage by candidate words, angle difference | Fit error, aspect ratio of rotated bounding box |
| Vertical range | Number of contiguous lines, percentage of range coverage by candidate lines, angle difference | Fit error, aspect ratio of rotated bounding box |
| Container | Number of enclosed words, percentage of interior area filled by enclosed words | Circular bucket coverage, ration of inner convex hull to outer convex hull. |
| Connector | Presence or absence of a head anchor | Curvature, stroke length, existence of an arrowhead at either side |

Horizontal Range—Let $H=\{P_1, \ldots, P_N\}$ be a set of points in strokes that are hypothesized to be a horizontal range. Let $R_{fit}(H)$ be the rotated bounding box of H according to the total regression on H. Let $W=\{W_1, \ldots, W_N\}$ be a set of words from the document context that are hypothesized to be covered by the range.

Number of Contiguous Words. The maximum number of words in W that are contiguous in the same parent line.

Percentage of Range Coverage by Candidate Words. Let $H_{\theta,c}$ be the range between the endpoints when H is projected against the regression line $(\theta, c)$. Let $\mu(H_{\theta,c})$ be the measure of that range along the line $(\theta, c)$. Similarly, let $W_{\theta,c}$ be the set of ranges when $W_i$ are projected against $(\theta, c)$.

$$\Omega_{\theta,c} = \bigcup_{w \in W_{\theta,c}} w$$

$$cov(H, W) = \frac{\sum_{\omega \in \Omega_{\theta,c}} \mu(H_{\theta,c} \cap \omega)}{\mu(H_{\theta,c})}$$

Fit Error. The total regression error of the points in H.

$$err(H) \equiv \frac{1}{N} \min_{\theta,c} \sum_{i=1}^{N} (p_{ix}\cos\theta + P_{iy}\sin\theta + c)^2$$

Aspect Ratio of Rotated Bounding Box. The width of the rotated bounding box $R_{fit}(H)$ divided by its height.

Vertical Range—Let V $\{P_1, \ldots, P_N\}$ be a set of points in strokes that are hypothesized to be a horizontal range. Let $R_{fit}(V)$ be the rotated bounding box of V according to total regression. Let $L=\{L_1, \ldots, L_M\}$ be a set of words from the document context that are hypothesized to be covered by the range.

Number of Contiguous Lines. The maximum number of words in L that are contiguous in the same parent block.

Percentage of Range Coverage by Candidate Lines. Let $V_{\theta,c}$ be the range between the endpoints when V is projected against the regression line $(\theta, c)$. Let $\mu(V_{\theta,c})$ be the measure of that range along the line $(\theta, c)$. Similarly, let $L_{\theta,c}$ be the set of ranges when $L_i$ are projected against $(\theta, c)$.

$$\Lambda_{\theta,c} = \bigcup_{l \in L_{\theta,c}} l$$

$$cov(V, L) = \frac{\sum_{\lambda \in \Lambda_{\theta,c}} \mu(V_{\theta,c} \cap \lambda)}{\mu(V_{\theta,c})}$$

Container—Let $C=\{S_1, \ldots, S_N\}$ be a set of strokes that is hypothesized to be a container. Let $W=\{W_1, \ldots, W_M\}$ be a set of words from the document context that are hypothesized to be covered by the container.

Let $B=\{B_1, \ldots, B_M\}$ be a collection of radial point buckets around C's centroid, as shown in FIG. 70. Each bucket is defined by:

$$B_i = \{P_j \in C | (i-1)2\pi/M \leq \phi_j < i2\pi/M \text{ and } \phi_j = \Box \overline{P_jC}\}$$

Number of Enclosed Words. This is number of words in W, or |W|.

Percentage of Inner Area Filled by Enclosed Words. For each bucket, let the outer area, $C_{Bi}$ be the convex hull of the points in the bucket $B_i$, and the total area be the convex hull of the entire container $C_C$. Then the inner area, IA, is given by:

$$IA = C_C - \bigcup_i C_{Bi}$$

And the percentage of inner area filled by words is:

$$\text{filled} = \frac{\sum_{W_i \in W} \text{area}(IA \cap W_i)}{\text{area}(IA)}$$

Circular Bucket Coverage. This is the percentage of buckets that contain points:

$$\text{coverage} = \frac{1}{N} \sum_{i=1}^{N} c_i \text{ where } c_i \begin{cases} 1 \text{ if } |B_i| > 0 \\ 0 \text{ else} \end{cases}$$

Figure 12:
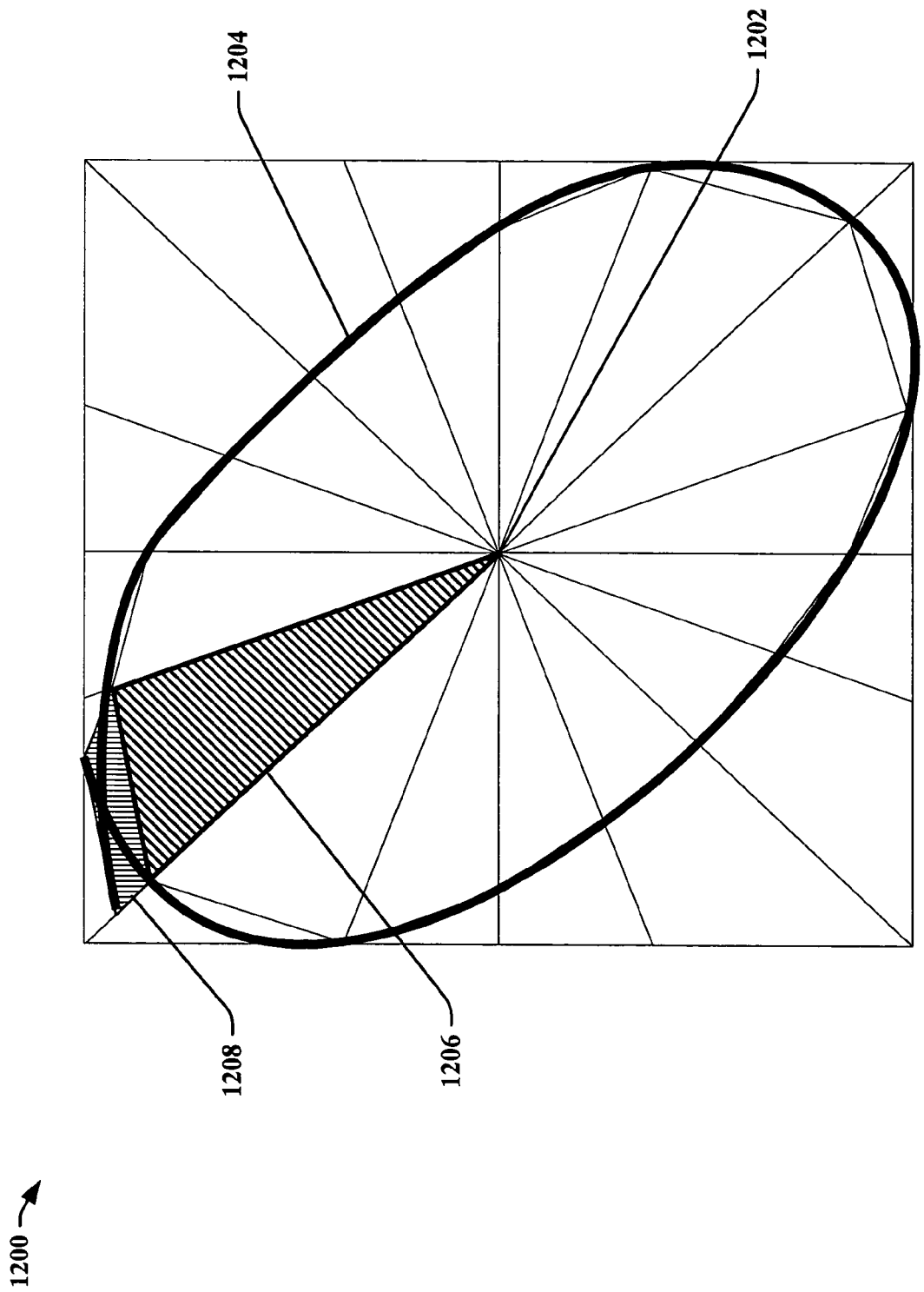
FIG. 12 is an illustration of container area determined via radial buckets in accordance with an aspect of the present invention.

Ratio of Inner Area to Total Area. The ratio of the inner area IA to the area of the outer convex hull $C_C$ is depicted in the illustration 1200 of FIG. 12. A collection of radial buckets $B_i$ around the centroid 1202 of the stroke points 1204. The inner area 1206 for one bucket is shown and the outer area 1208 is shown. The total area is for the bucket is the inner area 1206 plus the other area 1208.

Connector—Let $C=\{S_1, \ldots, S_N\}$ be a set of strokes that is hypothesized to be a connector. Let W be a word from the document context that is hypothesized to be at one end of the connector.

Presence or Absence of a Head Anchor. Let $P_H$ be the hypothesized head of the connector, and $(\theta, c)$ be the tangent. Let $\{Q_i\}$ be all the corner points of all the words W on the page. A weighted elliptical score is utilized to penalize words that are off tangent:

$$d_\varepsilon(Q) = \frac{(1+\varepsilon)\|\overline{P_HQ}\|}{1 + \varepsilon\cos(\Box\overline{P_HQ} - \theta)}$$

Curvature. The normalized curvature of a stroke $S=(P_1, \ldots, P_N)$ is the sum of the curvature at each point when the stroke is resampled with constant K points as $S_K=(Q_1, \ldots, Q_K)$.

$$\Omega_K(S) = \sum_{i=2}^{K-1} \Box\overline{Q_{i+1}Q_i} - \Box\overline{Q_iQ_{i-1}}$$

Stroke Length. The stroke length of a stroke $S=(P_1, \ldots, P_N)$ is the sum of the length of each segment:

$$\|S\| = \sum_{i=1}^{N-1} \|P_{i+1} - P_i\|$$

Existence of Arrowhead. The heuristic for arrowhead detection is slightly involved. Let $C_A$ denote the convex hull of a set of strokes A that is hypothesized as an arrowhead. Let $(\theta, c)$ is the tangent at the end of the connector.

The hypothesized arrow head is:

$$P_1 = \arg\max_{p \in C_A} (p_x\cos\theta + p_y\sin\theta + c)$$

The left-most point is:

$$P_2 = \arg\max_{p \in C_A} (-p_x \sin\theta + p_y \cos\theta + c)$$

The right-most point is:

$$P_2 = \arg\min_{p \in C_A} (-p_x \sin\theta + p_y \cos\theta + c)$$

Let $A_{12}$, $A_{23}$, $A_{31}$ denote the points in $C_A$ cut by lines $P_1P_2$, $P_2P_3$, and $P_3P_1$ respectively. The regression error of $A_{12}$, $A_{23}$, and $A_{31}$, are the features for arrowhead detection. Hand-tuned thresholds determine whether there is an arrowhead at either side of the connector.

Returning back to the detection process, once all of the detectors have executed, the most likely annotations are extracted from the map through a resolution process and the result is committed to the output (see, for example, FIG. 10(D) 1008). The resolution is designed to pick the best candidates when there are conflicting hypotheses. It is a unifying framework by which detectors can be added modularly to support new annotation types.

Resolution is designed to maximize number of explained strokes, maximize the overall confidence, and minimize the number of hypotheses. This can be expressed as the maximization of an energy function:

$$E = \sum_i confidence_i + \alpha |\text{explained strokes}| - \beta |\text{hypotheses}| \quad \text{(Eq. 1)}$$

In Equation 1, $\alpha$ and $\beta$ are empirically-determined weights. This function is maximized exactly utilizing dynamic programming. Since there is no special ordering of the strokes, one is arbitrarily imposed and solved utilizing the following recurrence relation:

$$E(S) = \begin{cases} 0 & \text{if } S \text{ is empty} \\ \max_{S'}(C(S') + E(S - S') - \beta) & \text{otherwise} \end{cases} \quad \text{(Eq. 2)}$$

In Equation 2, S represents a subset of strokes on the page, S' is a hypothesis containing the stroke in S with minimum ID, or no explanation for that stroke, and C is the confidence of that explanation plus a times the strokes it explains, or 0 if the minimum stroke is left unexplained.

The evaluation goals were two-fold. First, the accuracy of the complete system needed to be comprehended. Second, the effectiveness of the resolution process needed to be understood. Thus, the accuracy of each of the detectors was measured and compared those numbers with the final system accuracy. The test set consisted of ~100 heavily annotated web pages containing 229 underlines, 250 strikethroughs, 422 containers, 255 callouts and 36 vertical ranges. To simplify accounting, grouping errors and labeling errors were unified into one unit. In other words, an annotation is correct if it is grouped and labeled properly, otherwise it results in a false negative and possibly multiple false positives.

TABLE 1

Results from running the individual detectors prior to resolution.

|  | Correct | False positive | False negative |
| --- | --- | --- | --- |
| Underline | 219 | 183 | 10 |
| Strikethrough | 244 | 99 | 6 |
| Blob | 400 | 6 | 22 |
| Callout | 206 | 529 | 49 |
| Margin bar | 35 | 219 | 1 |

TABLE 2

System results after resolution including percentage changes from the data in Table 1. Percentages are obtained by $N_{final} - N_{initial}/N_{true}$.

|  | Correct | False positive | False negative |
| --- | --- | --- | --- |
| Underline | 206 (−5.7%) | 24 (−69.4%) | 16 (+2.6%) |
| Strikethrough | 229 (−6%) | 35 (−25.6%) | 9 (+1.2%) |
| Blob | 396 (−0.9%) | 6 (0%) | 25 (+0.7%) |
| Callout | 177 (−11.3%) | 31 (−195%) | 77 (+11%) |
| Margin bar | 35 (0%) | 140 (−225%) | 1 (0%) |

These results show that the system has reasonably high accuracy despite the inherent ambiguity in the problem, the small quantities of training data, and the compromises made in choosing the techniques such that the system could operate in real-time. Additional useful features are achievable when a larger data set is utilized. The results further show that resolution significantly decreases the number of false positives without substantial change to the false negatives. This indicates that it is a reasonable strategy for this problem.

Thus, the present invention provides an approach to recognizing freeform digital ink annotations on electronic documents, along with a practical implementation. The resulting recognizer facilitates all of the operations common to traditional digital annotations, but through the natural and transparent medium of direct digital ink and/or scanned digital ink. Rather than constraining the user, the present invention employs an extensible framework for annotation recognition which achieves high accuracy even for complex documents. It approximates an exhaustive search of possible segmentations and classifications. This makes it possible to analyze a full page of ink in real-time and can be applied to many other ink recognition problems. One instance of the present invention employs a reusable software component that can be integrated, for example, into a full system for annotating web pages.

In addition, many of the structures that are recognized such as boxes and connectors, are also common to other types of sketching such as flow charts and engineering diagrams. The present invention's efficient inference algorithm can also extend to these domains. Furthermore, it is possible for users to customize the system with their own annotation styles if they are not supported by a basic set.

Figure 13:
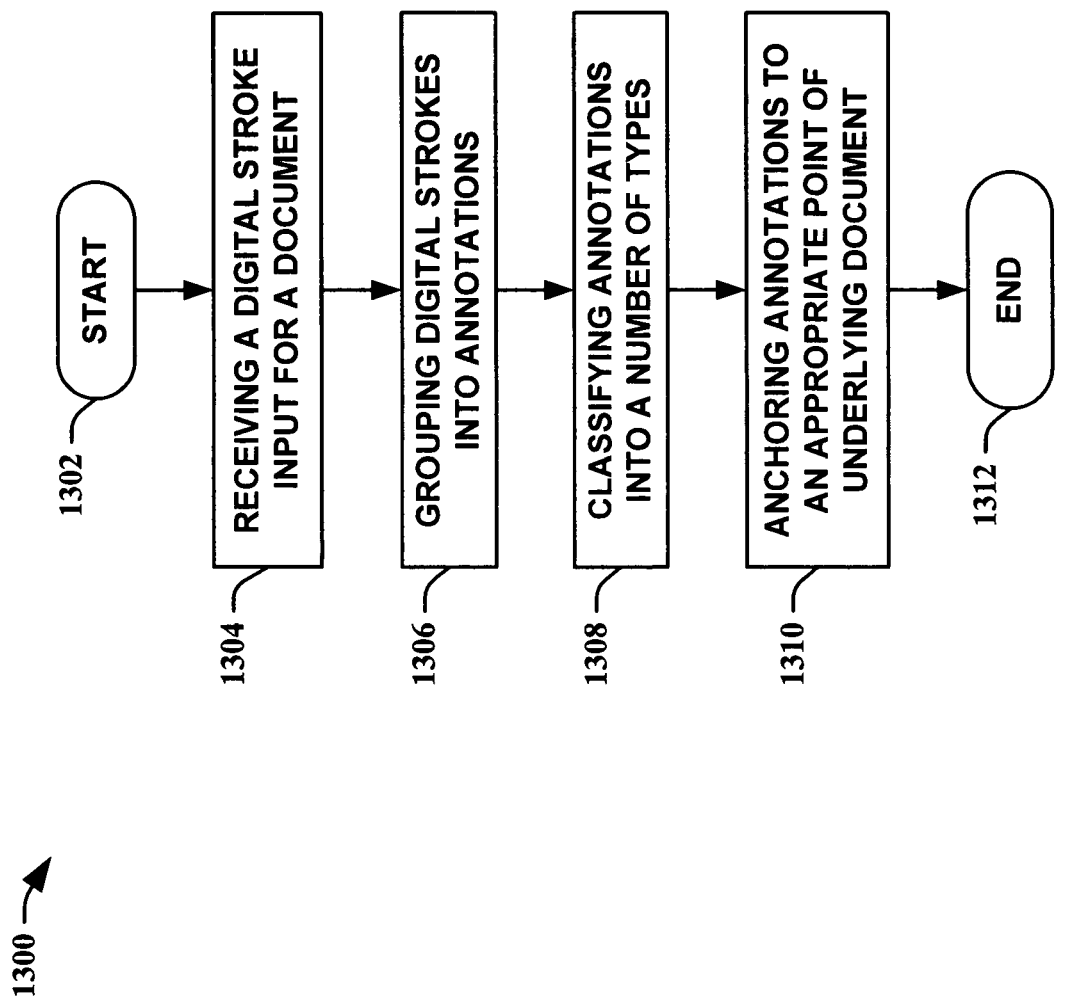
FIG. 13 is a flow diagram of a method of facilitating annotation recognition in accordance with an aspect of the present invention.
Figure 14:
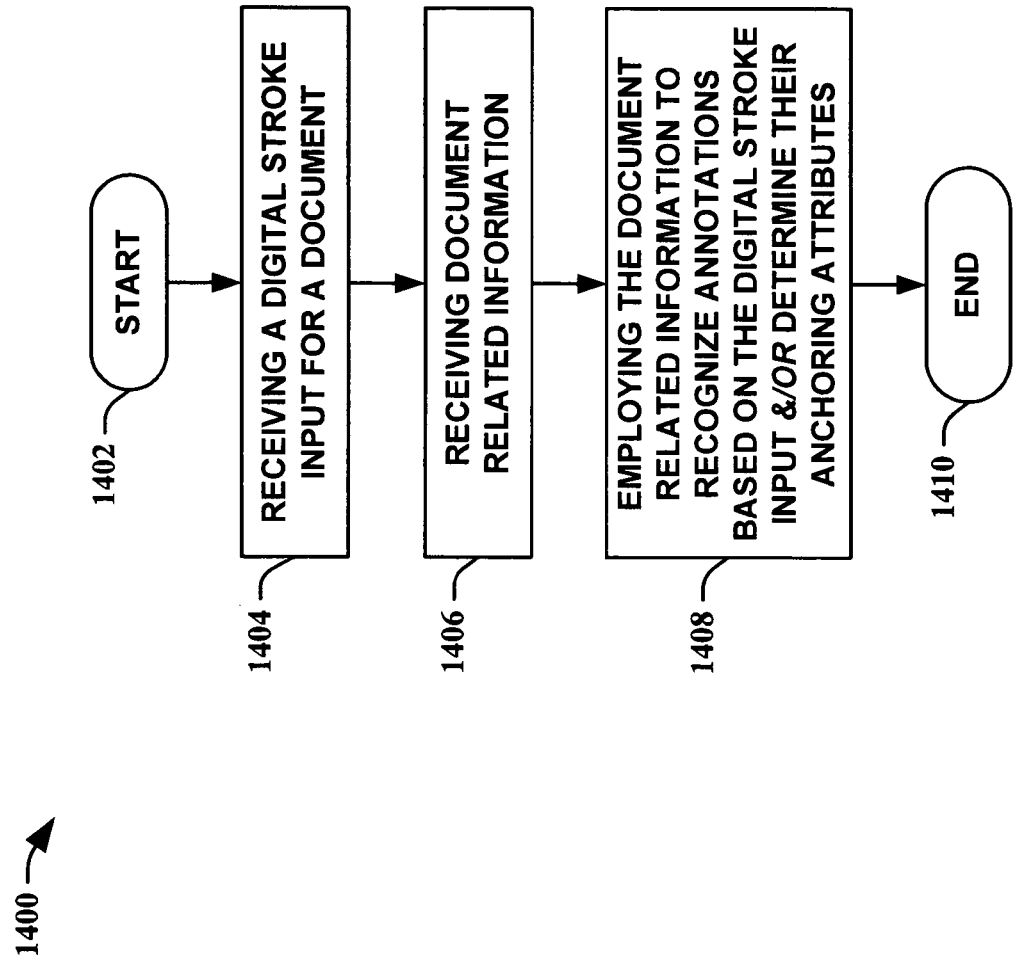
FIG. 14 is another flow diagram of a method of facilitating annotation recognition in accordance with an aspect of the present invention.
Figure 15:
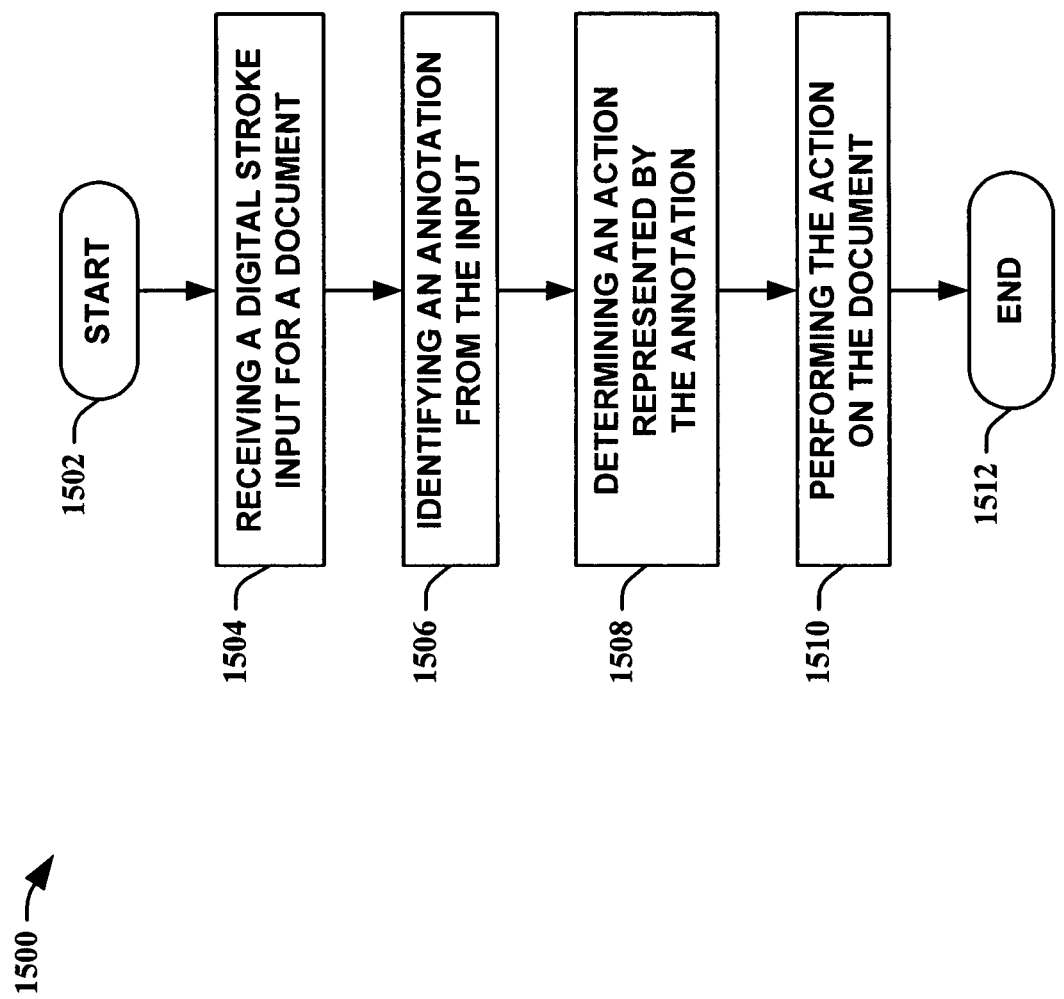
FIG. 15 is yet another flow diagram of a method of facilitating annotation recognition in accordance with an aspect of the present invention.

In view of the exemplary systems shown and described above, methodologies that may be implemented in accordance with the present invention will be better appreciated with reference to the flow charts of FIGS. 13-15. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 13, a flow diagram of a method 1300 of facilitating annotation recognition in accordance with an aspect of the present invention is shown. The method 1300 starts 1302 by receiving a digital ink stroke input for a document 1304. The input can be direct digital ink strokes from a digital writing surface and/or digital ink strokes that have been scanned/digitized from a paper copy and the like. The digital ink strokes are then grouped into possible annotations 1306. Detectors are utilized to classify the groups into classification types, "recognizing" the annotations 1308. In other instances of the present invention, resolution techniques are utilized to resolve conflicts when an annotation is construed to fall within multiple types and the like. The recognized annotations are then anchored to appropriate points within the document 1310, ending the flow. Recognition and anchoring of the annotations allows the present invention to provide such additional features as beautification, reflow, and actioning. Other instances of the present invention include providing an "annotation indicator" that facilitates in locating a recognized annotation even when the recognized annotation is not visible. This can occur when a page is summarized and the like. Additionally, annotations can be recognized via the present invention on media types including, but not limited to, typewritten text, photographic images, geometric vector graphics images, digital ink handwriting, and digital ink drawings.

Referring to FIG. 14, another flow diagram of a method 1400 of facilitating annotation recognition in accordance with an aspect of the present invention is illustrated. The method 1400 starts 1402 by receiving a digital ink stroke input for a document 1404. Document related information is also received 1406. The document related information (i.e., context) is utilized to facilitate in recognizing annotations and/or annotation anchor points from the digital ink stroke input 1408, ending the flow 1410. In one instance of the present invention, the document related information is a document context that is a tree structure that starts at a page. The page contains zero or more text blocks and zero or more graphics objects. Text blocks contain one or more paragraphs, which contain one or more liens, which contain one or more words. This particular type of structure is utilized in a method of the present invention to isolate it from the underlying meaning of the text to provide a language-independent solution. Other instances of the present invention utilize the underlying meaning of the text to form a language-dependent solution. One skilled in the art can appreciate the flexibility of the present invention in being able to utilize a wide variety of input information to facilitate in processing different types of documents.

Turning to FIG. 15, yet another flow diagram of a method 1500 of facilitating annotation recognition in accordance with an aspect of the present invention is shown. The method 1500 starts 1502 by receiving a digital ink stroke input for a document 1504. An annotation is then recognized from the digital ink stroke input as described supra 1506. An action represented by the recognized annotation is then determined 1508. In an optional step, the action is then performed on the document 1510, ending the flow. An instance of the present invention can be utilized without requiring the action to be performed. For example, the present invention can be utilized to output the represented actions so that a user can compile a list of the actions for summarization, etc., such as an editing list of the number of words to delete, capitalize, change, and/or add to the document.

Figure 16:
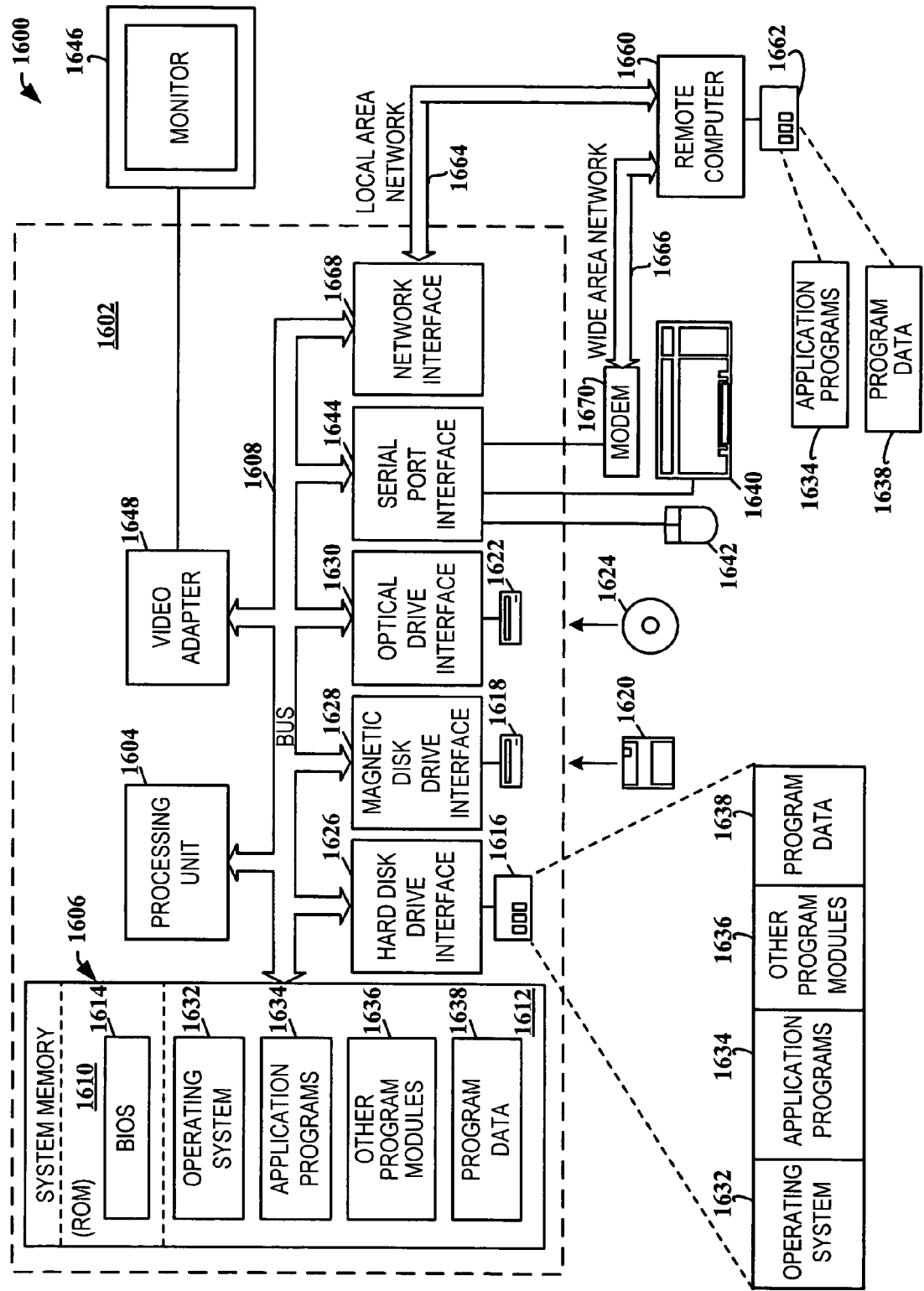
FIG. 16 illustrates an example operating environment in which the present invention can function.

In order to provide additional context for implementing various aspects of the present invention, FIG. 16 and the following discussion is intended to provide a brief, general description of a suitable computing environment 1600 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 16, an exemplary system environment 1600 for implementing the various aspects of the invention includes a conventional computer 1602, including a processing unit 1604, a system memory 1606, and a system bus 1608 that couples various system components, including the system memory, to the processing unit 1604. The processing unit 1604 may be any commercially available or proprietary processor. In addition, the processing unit may be implemented as multi-processor formed of more than one processor, such as may be connected in parallel.

The system bus 1608 may be any of several types of bus structure including a memory bus or memory controller, a peripheral bus, and a local bus using any of a variety of conventional bus architectures such as PCI, VESA, Microchannel, ISA, and EISA, to name a few. The system memory 1606 includes read only memory (ROM) 1610 and random access memory (RAM) 1612. A basic input/output system (BIOS) 1614, containing the basic routines that help to transfer information between elements within the computer 1602, such as during start-up, is stored in ROM 1610.

The computer 1602 also may include, for example, a hard disk drive 1616, a magnetic disk drive 1618, e.g., to read from or write to a removable disk 1620, and an optical disk drive 1622, e.g., for reading from or writing to a CD-ROM disk 1624 or other optical media. The hard disk drive 1616, magnetic disk drive 1618, and optical disk drive 1622 are connected to the system bus 1608 by a hard disk drive interface 1626, a magnetic disk drive interface 1628, and an optical drive interface 1630, respectively. The drives 1616-1622 and their associated computer-readable media provide nonvolatile storage of data, data structures, computer-executable instructions, etc. for the computer 1602. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1600, and further that any such media may contain computer-executable instructions for performing the methods of the present invention.

A number of program modules may be stored in the drives 1616-1622 and RAM 1612, including an operating system 1632, one or more application programs 1634, other program modules 1636, and program data 1638. The operating system 1632 may be any suitable operating system or combination of operating systems. By way of example, the application programs 1634 and program modules 1636 can include an annotation recognition scheme in accordance with an aspect of the present invention.

A user can enter commands and information into the computer 1602 through one or more user input devices, such as a keyboard 1640 and a pointing device (e.g., a mouse 1642). Other input devices (not shown) may include a microphone, a joystick, a game pad, a satellite dish, a wireless remote, a scanner, or the like. These and other input devices are often connected to the processing unit 1604 through a serial port interface 1644 that is coupled to the system bus 1608, but may be connected by other interfaces, such as a parallel port, a game port or a universal serial bus (USB). A monitor 1646 or other type of display device is also connected to the system bus 1608 via an interface, such as a video adapter 1648. In addition to the monitor 1646, the computer 1602 may include other peripheral output devices (not shown), such as speakers, printers, etc.

It is to be appreciated that the computer 1602 can operate in a networked environment using logical connections to one or more remote computers 1660. The remote computer 1660 may be a workstation, a server computer, a router, a peer device or other common network node, and typically includes many or all of the elements described relative to the computer 1602, although for purposes of brevity, only a memory storage device 1662 is illustrated in FIG. 16. The logical connections depicted in FIG. 16 can include a local area network (LAN) 1664 and a wide area network (WAN) 1666. Such networking environments are commonplace in offices, enterprise-wide computer networks, intranets and the Internet.

When used in a LAN networking environment, for example, the computer 1602 is connected to the local network 1664 through a network interface or adapter 1668. When used in a WAN networking environment, the computer 1602 typically includes a modem (e.g., telephone, DSL, cable, etc.) 1670, or is connected to a communications server on the LAN, or has other means for establishing communications over the WAN 1666, such as the Internet. The modem 1670, which can be internal or external relative to the computer 1602, is connected to the system bus 1608 via the serial port interface 1644. In a networked environment, program modules (including application programs 1634) and/or program data 1638 can be stored in the remote memory storage device 1662. It will be appreciated that the network connections shown are exemplary and other means (e.g., wired or wireless) of establishing a communications link between the computers 1602 and 1660 can be used when carrying out an aspect of the present invention.

In accordance with the practices of persons skilled in the art of computer programming, the present invention has been described with reference to acts and symbolic representations of operations that are performed by a computer, such as the computer 1602 or remote computer 1660, unless otherwise indicated. Such acts and operations are sometimes referred to as being computer-executed. It will be appreciated that the acts and symbolically represented operations include the manipulation by the processing unit 1604 of electrical signals representing data bits which causes a resulting transformation or reduction of the electrical signal representation, and the maintenance of data bits at memory locations in the memory system (including the system memory 1606, hard drive 1616, floppy disks 1620, CD-ROM 1624, and remote memory 1662) to thereby reconfigure or otherwise alter the computer system's operation, as well as other processing of signals. The memory locations where such data bits are maintained are physical locations that have particular electrical, magnetic, or optical properties corresponding to the data bits.

Figure 17:
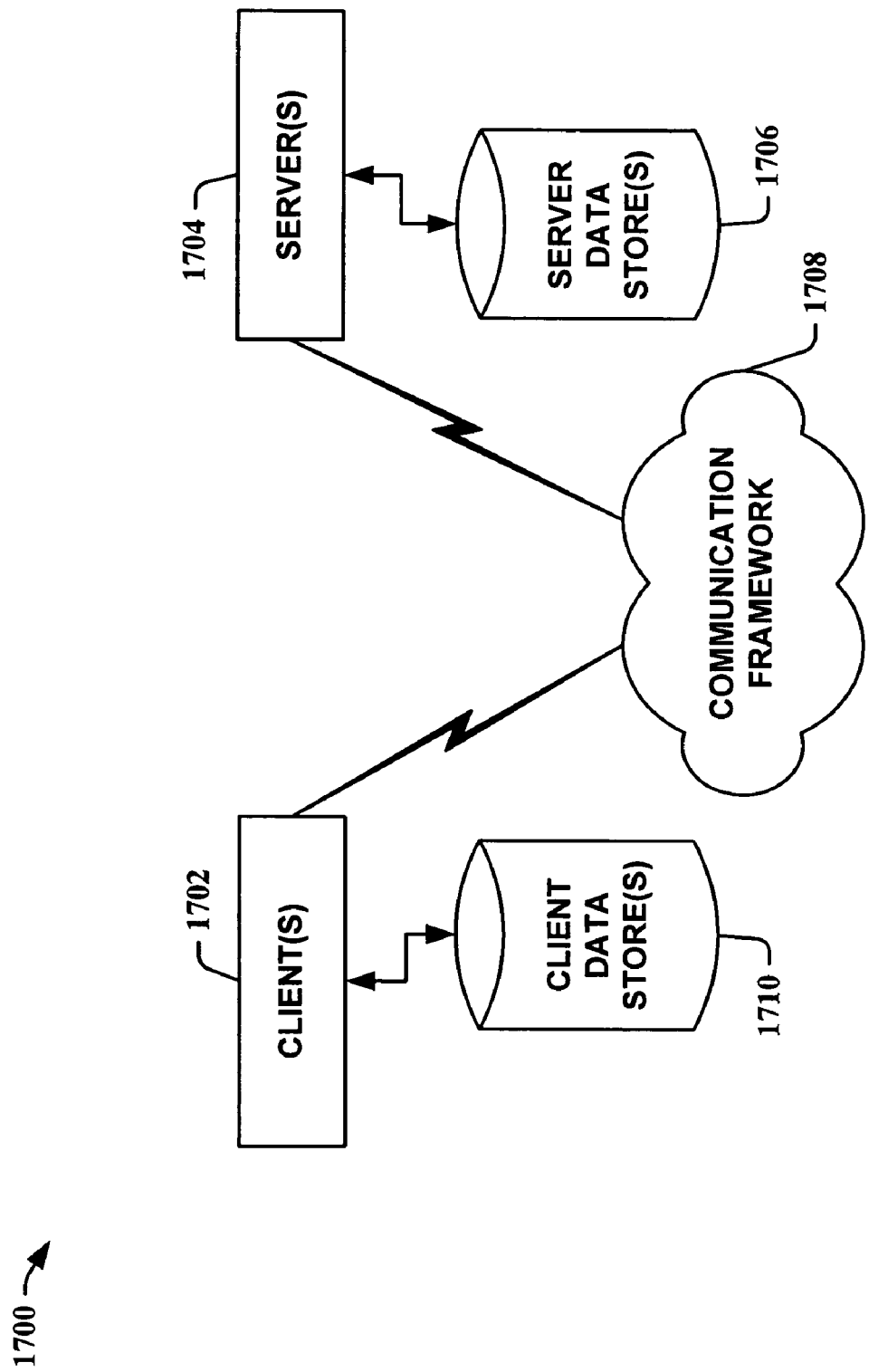
FIG. 17 illustrates another example operating environment in which the present invention can function.

FIG. 17 is another block diagram of a sample computing environment 1700 with which the present invention can interact. The system 1700 further illustrates a system that includes one or more client(s) 1702. The client(s) 1702 can be hardware and/or software (e.g., threads, processes, computing devices). The system 1700 also includes one or more server(s) 1704. The server(s) 1704 can also be hardware and/or software (e.g., threads, processes, computing devices). One possible communication between a client 1702 and a server 1704 may be in the form of a data packet adapted to be transmitted between two or more computer processes. The system 1700 includes a communication framework 1708 that can be employed to facilitate communications between the client(s) 1702 and the server(s) 1704. The client(s) 1702 are connected to one or more client data store(s) 1710 that can be employed to store information local to the client(s) 1702. Similarly, the server(s) 1704 are connected to one or more server data store(s) 1706 that can be employed to store information local to the server(s) 1704.

In one instance of the present invention, a data packet transmitted between two or more computer components that facilitates recognition is comprised of, at least in part, information relating to an annotation recognition system that utilizes, at least in part, a digital ink stroke input to recognize at least one annotation.

It is to be appreciated that the systems and/or methods of the present invention can be utilized in annotation recognition facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates recognition, comprising:
at least one processor configured to execute the following computer-executable components:
a component that receives at least one input containing digital ink strokes;
a computer-executable recognition component that identifies and groups at least a subset of the digital ink strokes from the input into at least one recognized annotation;
a computer-executable classification component executing from a computer memory employing at least one type detector that classifies the recognized annotation into at least one type of a group of extensible types, the at least one type detector determines a best idealized version of the subset of the digital ink strokes of the at least one recognized annotation determined according to the at least one type using stroke features that capture similarity of the subset of the digital ink strokes with an idealized version of an annotation associated with the at least one type detector; a resolution component that facilitates the recognition of the subset of the digital ink strokes by maximizing a number of explained strokes, maximizing an overall confidence, and minimizing a number of hypotheses for the input, the resolution component optimizes recognition of the annotation via employment of an energy function given by:

$$E = \sum_i confidence_i + \alpha |\text{explained strokes}| - \beta |\text{hypotheses}|$$

where $\alpha$ and $\beta$ are empirically-determined weights.

2. The computer-implemented system of claim 1, the computer-executable recognition component recognizes the annotation in real-time.

3. The computer-implemented system of claim 1, the computer-executable recognition component employs background processes to obtain the recognized annotation.

4. The computer-implemented system of claim 1, the at least one type detector includes at least one of a horizontal range type detector, a vertical range type detector, a connector type detector, a symbol type detector, a writing type detector, a drawing type detector, or a container type detector.

5. The computer-implemented system of claim 1 further comprising an anchoring component that anchors the annotation to an appropriate portion of the input.

6. The computer-implemented system of claim 5 further comprising a reflow component that employs annotation anchor points to automatically and logically reflow an annotation when the input is manipulated.

7. The computer-implemented system of claim 1, the input further comprising a document context relating to the digital ink strokes.

8. The computer-implemented system of claim 7, the at least one type detector compares the fit of the best idealized version of the at least a subset of the digital ink strokes with the document context using context features to facilitate in recognizing at least one annotation.

9. The computer-implemented system of claim 7, the document context comprising a tree structure.

10. The computer-implemented system of claim 1, the computer-executable recognition component further provides an annotation indicator for the recognized annotation to identify a recognized annotation location when the input is summarized.

11. The computer-implemented system of claim 1 further comprising a linguistic analysis component that employs a linguistic context of the input to facilitate the computer-executable recognition component in proper recognition of at least one annotation.

12. The computer-implemented system of claim 1, the computer-executable recognition component further employs domain specific information to facilitate in determining at least one recognized annotation.

13. The computer-implemented system of claim 12, the domain specific information comprising at least one selected from the group consisting of user specific information, professional genre information, and annotation guideline information.

14. The computer-implemented system of claim 1 further comprising an action determination component that determines at least one action indicated by the recognized annotation, the action comprising one of performing deletions in, capitalizing, changing, or adding to at least a portion of the input other than the digital ink strokes.

15. The computer-implemented system of claim 1, the resolution component further employs dynamic program to facilitate in a resolution of the energy function.

16. A computer readable medium having stored thereon computer executable instructions for implementing components of the computer-implemented system of claim 1.

17. A method for facilitating computer-implemented recognition, comprising:
employing a processor to execute computer executable instructions stored in memory to perform the following acts:
receiving at least one input containing digital ink strokes;
identifying and grouping at least a subset of the digital ink strokes from the input into at least one recognized annotation;
classifying the recognized annotation into at least one type of a group of extensible types based in part on the output of at least one computer-executable type detector;
determining with the at least one computer-executable type detector a best idealized version of the subset of the digital ink strokes of the at least one recognized annotation, the best idealized version is determined according to the at least one type using stroke features that determine similarity of the subset of the digital ink strokes of the at least one recognized annotation to an idealized version of an annotation associated with the at least one computer executable type detector;
recognizing the annotation associated with the subset of the digital ink strokes by maximizing a number of explained strokes, maximizing an overall confidence, and minimizing a number of hypotheses for the input, wherein the recognition of the annotation is optimized via employment of an energy function given by:

$$E = \sum_i confidence_i + \alpha |\text{explained strokes}| - \beta |\text{hypotheses}|$$

where $\alpha$ and $\beta$ are empirically-determined weights.

18. The method of claim 17, the identifying and grouping of the subset of the digital ink strokes to form a recognized annotation occurring in real-time.

19. The method of claim 17, the group of extensible types including at least one selected from the group consisting of horizontal range type, vertical range type, container type, connector type, symbol type, writing type, or drawing type.

20. The method of claim 17, the computer-executable type detector comprising at least one selected from the group consisting of horizontal range type detector, vertical range type detector, container type detector, connector type detector, symbol type detector, writing type detector, and drawing type detector.

21. The method of claim 17 further comprising:
employing machine learning to facilitate in classifying the annotation.

22. The method of claim 17 further comprising:
anchoring the annotation to an appropriate portion of the input.

23. The method of claim 22 further comprising:
employing an annotation anchor point to automatically and logically reflow an annotation when the input is manipulated.

24. The method of claim 17, the input comprising at least one selected from the group consisting of digital information from a digital writing device and digital information from a scanned input.

25. The method of claim 17, the input further comprising a document context relating to the digital ink strokes.

26. The method of claim 25 further comprising:
comparing the fit of the best idealized version of the at least a subset of the digital ink strokes with the document context using context features to facilitate in recognizing at least one annotation.

27. The method of claim 25, the document context comprising a tree structure.

28. The method of claim 17 further comprising:
providing an annotation indicator for the recognized annotation to identify a recognized annotation location when the input is summarized.

29. The method of claim 17 further comprising:
employing a linguistic context of the input to facilitate in proper recognition of at least one annotation.

30. The method of claim 17 further comprising:
utilizing domain specific information to facilitate in determining at least one recognized annotation.

31. The method of claim 30, the domain specific information comprising at least one selected from the group consisting of architectural diagrams and geographic maps.

32. The method of claim 17 further comprising:
recognizing annotations on at least one media type selected from the group consisting of a typewritten text, a photographic image, a geometric vector graphics image, a digital ink handwriting, and a digital ink drawing.

33. The method of claim 17 further comprising:
determining at least one action indicated by the recognized annotation.

34. The method of claim 17 further comprising:
employing a plurality of candidate annotations to facilitate in recognizing an annotation.

35. The method of claim 17 further comprising:
utilizing one or more of a stylistic or non-stylistic characteristic of the digital ink strokes to facilitate in recognizing the annotation.

36. The method of claim 35, the stylistic characteristic comprising at least one selected from the group consisting of a color of a digital ink stroke, a thickness of a digital ink stroke, a pen tip style employed to create a digital ink stroke, a transparency level of a digital ink stroke, and a viscosity level of a digital ink stroke.

37. The method of claim 35, the non-stylistic characteristic comprising at least one selected from the group consisting of a timestamp on a digital ink stroke and a serial number on a pen tip cursor utilized to create a digital ink stroke.

38. The method of claim 17 further comprising:
providing searchable recognized annotations based, at least in part, on digital ink strokes.

39. The method of claim 17 further comprising: utilizing dynamic programming to facilitate in a resolution of the energy function.

40. A device employing the method of claim 17 comprising at least one selected from the group consisting of a computer, a server, and a handheld electronic device.

41. A system that facilitates recognition, comprising:
means for receiving at least one input containing digital ink strokes;
means for storing the received input;
means for identifying and grouping at least a subset of the digital ink strokes from the input into at least one recognized annotation by maximizing a number of explained strokes, maximizing an overall confidence, and minimizing a number of hypotheses for the input, wherein the recognition of the annotation is optimized via employment of an energy function given by:

$$E = \sum_i confidence_i + \alpha |\text{explained strokes}| - \beta |\text{hypotheses}|$$

where $\alpha$ and $\beta$ are empirically-determined weights;
means for classifying the recognized annotation into at least one type of a group of extensible types based in part on the output of at least one type detector;
means for determining a best idealized version of the at least a subset of the digital ink strokes of the at least one recognized annotation according to the at least one type using stroke features of the at least a subset of the digital ink strokes that facilitate in determining similarity of the best idealized version to an idealized version of an annotation associated with the at least one type detector; and
means for comparing the fit of the best idealized version of the at least a subset of the digital ink strokes with contextual features associated with the at least one input.

* * * * *